(12) United States Patent
Yanagawa

(10) Patent No.: US 10,656,270 B2
(45) Date of Patent: May 19, 2020

(54) OBJECT DETECTION DEVICE, OBJECT DETECTION METHOD, AND PROGRAM

(71) Applicant: OMRON Corporation, Kyoto (JP)

(72) Inventor: Yukiko Yanagawa, Kyoto (JP)

(73) Assignee: OMRON Corporation, Kyoto (JP)

(*) Notice: Subject to any disclaimer, the term of this patent is extended or adjusted under 35 U.S.C. 154(b) by 253 days.

(21) Appl. No.: 15/751,152

(22) PCT Filed: Dec. 6, 2016

(86) PCT No.: PCT/JP2016/086219
§ 371 (c)(1),
(2) Date: Feb. 7, 2018

(87) PCT Pub. No.: WO2017/158949
PCT Pub. Date: Sep. 21, 2017

(65) Prior Publication Data
US 2018/0239020 A1    Aug. 23, 2018

(30) Foreign Application Priority Data
Mar. 15, 2016   (JP) ................. 2016-050942

(51) Int. Cl.
*G01S 17/08*   (2006.01)
*G06K 9/00*   (2006.01)
(Continued)

(52) U.S. Cl.
CPC .............. *G01S 17/08* (2013.01); *G01S 17/87* (2013.01); *G01S 17/89* (2013.01); *G01S 17/93* (2013.01);
(Continued)

(58) Field of Classification Search
None
See application file for complete search history.

(56) References Cited

U.S. PATENT DOCUMENTS 8,009,871 B2   8/2011   Rafii et al.
2006/0239558 A1   10/2006   Rafii et al.
(Continued)

FOREIGN PATENT DOCUMENTS

JP    2001349946    12/2001
JP    2002311138    10/2002
(Continued)

OTHER PUBLICATIONS

"Search Report of Europe Counterpart Application", dated Oct. 25, 2019, p. 1-p. 6.
(Continued)

*Primary Examiner* — Bernard Krasnic
(74) *Attorney, Agent, or Firm* — JCIPRNET

(57) ABSTRACT

This object detection device is provided with: an output unit; a plurality of detection units; a data acquisition unit; and an object information confirmation unit. The output unit outputs measurement light Lm towards an object. Each of the plurality of detection units detects, as a signal representing the distance to the object present in an observed area and the shape of the object, the reflected light generated as a result of the measurement light being reflected by the object. The data acquisition unit acquires detection signal waveforms W representing changes in the intensities of second signals over time. The object information confirmation unit confirms the range of the presence of the object by determining that any two or more of the detection units correspond to the same object, or correspond to different objects, on the basis of the detection signal waveforms.

20 Claims, 24 Drawing Sheets

(51) Int. Cl.
*G01S 17/89* (2020.01)
*G06K 9/20* (2006.01)
*G01S 17/87* (2020.01)
*G08G 1/16* (2006.01)
*G01S 17/931* (2020.01)
*G01S 17/93* (2020.01)
*G06K 9/62* (2006.01)

(52) U.S. Cl.
CPC ........ *G01S 17/931* (2020.01); *G06K 9/00805* (2013.01); *G06K 9/2018* (2013.01); *G06K 9/2036* (2013.01); *G08G 1/16* (2013.01); *G08G 1/167* (2013.01); *G06K 9/6218* (2013.01); *G08G 1/166* (2013.01)

(56) References Cited

U.S. PATENT DOCUMENTS

| | | | | |
|---|---|---|---|---|
| 2009/0119044 | A1* | 5/2009 | Levesque | G01S 7/484 |
| | | | | 702/69 |
| 2011/0052076 | A1* | 3/2011 | Yashiro | G06K 9/00362 |
| | | | | 382/190 |
| 2012/0307065 | A1 | 12/2012 | Mimeault et al. | |
| 2014/0159925 | A1* | 6/2014 | Mimeault | G01S 17/58 |
| | | | | 340/935 |
| 2015/0158489 | A1 | 6/2015 | Oh et al. | |
| 2015/0322585 | A1 | 11/2015 | Yoshikawa et al. | |
| 2016/0275788 | A1* | 9/2016 | Wu | G08G 1/04 |

FOREIGN PATENT DOCUMENTS

| | | |
|---|---|---|
| JP | 2003-270348 | 9/2003 |
| JP | 2011-17666 | 1/2011 |
| JP | 2013246087 | 12/2013 |
| JP | 2014092434 | 5/2014 |
| JP | 2014142242 | 8/2014 |

OTHER PUBLICATIONS

"Office Action of Japan Counterpart Application," dated May 22, 2018, with English translation thereof, p. 1-p. 7.
"International Search Report (Form PCT/ISA/210)" of PCT/JP2016/086219, dated Mar. 14, 2017, with English translation thereof, pp. 1-4.
"Written Opinion of the International Searching Authority (Form PCT/ISA/237)" of PCT/JP2016/086219, dated Mar. 14, 2017, with English translation thereof, pp. 1-8.
"Office Action of Korea Counterpart Application", dated Jul. 5, 2019, with English translation thereof, p. 1-p. 12.
"Office Action of Japan Counterpart Application", dated Dec. 25, 2018, with English translation thereof, p. 1-p. 6.

* cited by examiner

OBJECT DETECTION DEVICE, OBJECT DETECTION METHOD, AND PROGRAM

CROSS-REFERENCE TO RELATED APPLICATION

This application is a 371 of international application of PCT application serial no. PCT/JP2016/086219, filed on Dec. 6, 2016, which claims the priority benefit of Japanese Patent Application Laid-Open (JP-A) no. 2016-050942, filed on Mar. 15, 2016. The entirety of each of the abovementioned patent applications is hereby incorporated by reference herein and made a part of this specification.

BACKGROUND

Technical Field

The present invention relates to an object detection device that recognizes a nearby object and executes a predetermined process.

Related Art

Conventionally, a system that recognizes an obstacle near a moving body such as a vehicle and moves the moving body automatically or semi-automatically is known. For example, an advanced driver assistance system (ADAS) such as an automatic urgent brake automatically operating a brake of a moving body instead of an operator of the moving body in a case in which an obstacle and the moving body approach to each other is known. The system described above calculates a relative positional relation between a moving body that is a control target and an obstacle such as an oncoming car and a pedestrian by using information acquired from a sensor detecting the objects and controls the moving body on the basis of the positional relation.

Generally, the system described above measures a distance between an object and a moving body is measured using light such as infrared light on the basis of a time until the light is transmitted, reflected by the object, and returned. A sensor measuring such a distance generally includes a plurality of light detection elements arranged in an array pattern for acquiring information to a degree enabling recognition of the shape of an object.

In addition, by using the sensor described above, data that is an aggregate of two-dimensional coordinates projecting a detected object onto predetermined plane coordinates may be acquired. Each set of two dimensional coordinates may be associated as data in which a time until light is reflected by an object and is returned after the output of the light represents the depth (such data is called a "distance image"). In the system described above, in order to accurately control the moving body, it is necessary to recognize an object detected by the sensor from the distance image and calculate a distance from the object to the moving body. For such an object, in Patent Literature 1, a method of detecting a three dimensional image having depths and the shape of the image from a distance image is disclosed. In the method, an object included in a distance image is recognized by assuming that an aggregate of coordinate values of which data representing depths is within a predetermined range forms one object in a distance image.

[Patent Literature 1] U.S. Pat. No. 8,009,871

SUMMARY

In the above-described method of recognizing an object from a distance image, an object in a one-pixel unit (in units of detection elements of the sensor) included in the distance image is recognized. For this reason, the detection accuracy of a boundary of an object depends on the degree of integration of the detection elements included in the sensor. In addition, in a case in which the values of data representing depths are slightly different, it cannot be clearly determined whether a plurality of objects are arranged at different depth positions or one object is continuously present.

An object of the present invention is to detect the position and the arrangement state of an object without depending on the degree of integration of detection elements included in a sensor and the like in an object detection device recognizing a nearby object and performing a predetermined process.

Hereinafter, a plurality of aspects will be described as a means for solving the problems. These aspects may be arbitrarily combined as is necessary.

An object detection device according to one view point of the present invention includes: an output unit; a plurality of detection units; a data acquiring unit; and an object information determining unit. The output unit that outputs a first signal toward an object. Each of the plurality of detection units detects a second signal as a signal representing a distance to the object present in an observed area and a shape of the object. The second signal is a signal generated when the first signal is reflected by the object. The data acquiring unit acquires a detection signal waveform represented as a change in an intensity of the second signal with respect to time. The object information determining unit determines a presence range of the object by determining whether two or more arbitrary detection units correspond to the same object or different objects.

In the object detection device described above, first, the output unit outputs a first signal, and each of the plurality of detection units detects a second signal that is generated when the first signal is reflected by the object as a signal representing a distance to the object present in an observed area and a shape of the object. At this time, the data acquiring unit acquires a detection signal waveform representing a change in the intensity of the second signal with respect to time. After the acquisition of the detection signal waveform, the object information determining unit determines a presence range of the object by determining whether two or more arbitrary detection units correspond to the same object or different objects on the basis of the detection signal waveform.

In the object detection device described above, the detection signal waveform used for determining the arrangement state of the object is continuous information that is a change in the intensity of the second signal with respect to time. In this way, the object detection device can determine the distance and the arrangement state of an object detected by the detection unit with high accuracy, without depending on the degree of integration or the like of the detection units.

The two or more arbitrary detection units may be adjacent to each other on a detection surface. In such a case, it can be determined with high accuracy whether the two or more arbitrary detection units correspond to the same object or correspond to different objects.

The object information determining unit may determine whether the two or more arbitrary detection units correspond to the same object or different objects on the basis of a shape pattern of the detection signal waveform. In addition, the object information determining unit calculates a distance between the detection unit and the object on the basis of a time at which an edge is generated in the detection signal waveform.

In such a case, the object information determining unit can determine whether or not two or more arbitrary detection units correspond to the same object or correspond to different objects, and calculate a distance between the detection unit and the object on the basis of the shape of the detection signal waveform.

In a case in which one or more maximums of intensity are present in the detection signal waveform detected by one detection unit among the two or more arbitrary detection units, and time at which a maximum of the intensity of the detection signal waveform detected by another detection unit is taken coincides with any one of times at which the one or more maximums are taken, the object information determination unit may determine that the two or more arbitrary detection units corresponds to the same object.

In such a case, objects detected by the plurality of detection units can be determined as being the same object.

In a case in which the detection signal waveforms detected by the two or more arbitrary detection units have intensities fixed over long times or have maximums changing gently with respect to time, and time periods in which the detection signal waveforms having the intensities fixed over the long times or having the maximums gently changing with respect to time are generated overlap with each other, the object information determining unit may determine that the two or more arbitrary detection units correspond to the same object.

In such a case, objects detected by the plurality of detection units, for example, can be determined as one inclined object.

In a case in which one or more maximums of the intensity are present in the detection signal waveform detected by one detection unit among the two or more arbitrary detection units, and time at which a maximum of the intensity is taken m the detection signal waveform detected by another detection unit does not coincide with any one of times at which the one or more maximums are taken, the object information determining unit may determine that the two or more arbitrary detection units correspond to different objects.

In such a case, objects detected by the plurality of detection units can be determined as different objects.

In a case in which the detection signal waveform is detected by the two or more arbitrary detection units have intensities fixed over long times or have maximum values changing gently with respect to time, and time periods in which the detection signal waveforms having the intensities fixed over the long times or having maximums changing gently with respect to time do not overlap with each other, the object information determining unit may determine that the two or more arbitrary detection units correspond to different objects.

In such a case, for example, objects detected by the plurality of detection units can be determined as different inclined objects.

In a case in which a signal waveform having an intensity fixed over a long time is acquired by adding the detection signal waveforms of the two or more arbitrary detection units, the object information determining unit may determine that the two or more arbitrary detection units correspond to the same object.

In such a case, objects detected by the plurality of detection units can be determined as one inclined object.

An object detection method according to a different viewpoint of the present invention is an object detection method in an object detection device including a plurality of detection units. The object detection method includes the following steps.

a step of outputting a first signal toward an object.

a step of detecting a second signal generated when the first signal is reflected by the object as a signal representing a distance to the object present in an observed area and a shape of the object by using the plurality of detection units.

a step of acquiring a detection signal waveform represented as a change in an intensity of the second signal with respect to time.

a step of determining a presence range of the object by determining whether two or more arbitrary detection units correspond to the same object or different objects.

In the object detection method described above, the detection signal waveform used for determining the arrangement state of the object is continuous information that is a change in the intensity of the second signal with respect to time. In this way, the object detection device can determine the distance and the arrangement state of an object detected by the detection unit with high accuracy, without depending on the degree of integration or the like of the detection units.

A program according to a further another viewpoint of the present invention is a program causing a computer to execute the object detection method described above.

In an object detection device recognizing a nearby object and performing a predetermined process, the position and the arrangement state of an object can be detected without depending on the degree of integration of detection elements included in a sensor and the like.

DETAILED DESCRIPTION OF EMBODIMENTS

Figure 1:
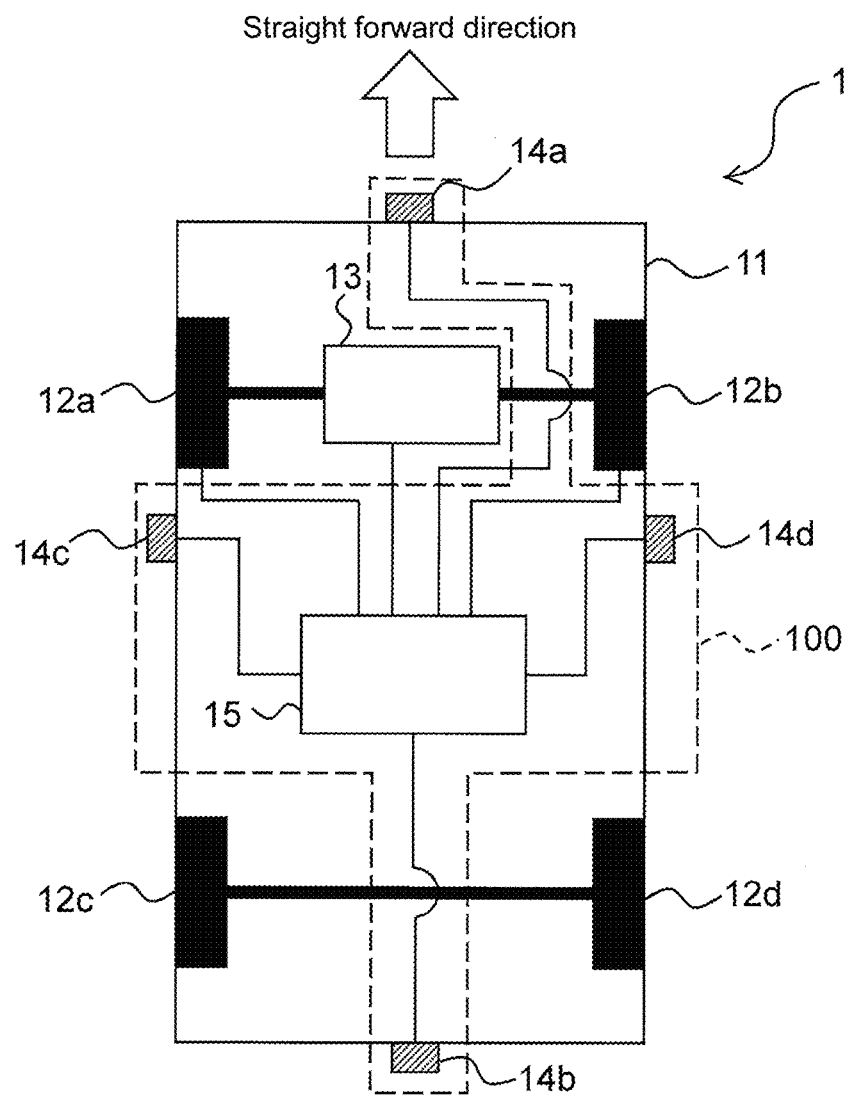
FIG. 1 is a diagram illustrating the configuration of a moving body system.

1. First Embodiment (1) Configuration of Moving Body System in which Object Detection Device is Used Hereinafter, the configuration of a moving body system 1 in which an object detection device 100 according to a first embodiment is used will be described with reference to FIG. 1. FIG. 1 is a diagram illustrating the configuration of a moving body system in which the object detection device is used. The object detection device 100 according to the first embodiment, for example, is a device that assists a driver with operation of a moving body such as a car.

The moving body system 1 includes a main body 11. The main body 11 configures the main body of the moving body system 1. The moving body system 1 includes wheels 12a, 12b, 12c, and 12d. The wheels 12a and 12b are mounted on an output rotational shaft of a driving unit (for example, an engine and/or an electric motor) to be rotatable around the axis through a speed reduction mechanism in a front part of the main body 11 in the straight forward direction. On the other hand, the wheels 12c and 12d are mounted in a rear part of the main body 11 in the straight forward direction to be rotatable around the axis.

The moving body system 1 includes a moving body control unit 13. The moving body control unit 13 is a computer system that is connected to a driving mechanism of brakes disposed in the wheels 12a and 12b, a driving mechanism of the driving unit (for example, an accelerator and a motor control device) and/or a driving mechanism of a steering wheel, and the like, and can control such mechanisms. The moving body control unit 13 controls the driving mechanisms described above on the basis of a determined positional relation between an object O and the main body 11 on behalf of an operator of the moving body system 1 as necessary.

More specifically, the moving body control unit 13 determines whether or not a detected object O is near the moving body system 1 (the main body 11) on the basis of real space data VD (to be described later). In a case in which an object O is determined to be near the moving body system 1, the moving body control unit 13, for example, outputs a moving body control signal for controlling the brake system, the driving unit, and the like described above to stop the moving body system 1 (the main body 11).

Alternatively, in a case in which an object O is determined to be near the moving body system 1, a moving body control signal for causing the moving body system 1 to avoid the object O may be configured to be output by controlling the steering system and the like described above.

The moving body system 1 includes four object detection sensors 14a, 14b, 14c, and 14d. As illustrated in FIG. 1, the object detection sensor 14a is mounted at a foremost part of the main body 11 in the straight forward direction and detects an object that is in front of the main body 11. The object detection sensor 14b is mounted at a rearmost part of the main body 11 in the straight forward direction and detects an object that is behind the main body 11. The object detection sensor 14c is mounted on the left side face of the main body 11 in the straight forward direction and detects an object that is on the left side of the main body 11. The object detection sensor 14d is mounted on the right side face of the main body 11 in the straight forward direction and detects an object that is on the right side of the main body 11.

In this embodiment, the object detection sensors 14a to 14d are time of flight (TOF) sensors measuring distances to an object O that is a detection target. However, the object detection sensors are not limited thereto, and, for example, distance measurement sensors of any other system such as laser range finders (LRF) measuring a distance based on a difference between images acquired by two cameras disposed on the left and right sides may be used. The configurations of the object detection sensors 14a to 14d according to this embodiment will be described later in detail.

The moving body system 1 includes a control unit 15. The control unit 15 is a computer system including a central processing unit (CPU), a storage device (a random access memory (RAM), a read only memory (ROM), a solid state drive (SSD), a hard disk drive (HDD), or the like) and various interfaces (for example, an A/D converter, a D/A converter, and the like).

The control unit 15 receives detection signals transmitted from the object detection sensors 14a to 14d and determines a positional relation between a nearby object O and the main body 11 on the basis of the detection signals. The configuration of the control unit 15 will be described later in detail.

By including the configurations described above, the moving body system 1 can assist an operator with operation of the moving body system 1 on the basis of a positional relation between the object O detected by the object detection sensors 14a to 14d and the main body 11. In addition, in this embodiment, the object detection sensors 14a to 14d and the control unit 15 configure an object detection device 100.

(2) Configuration of Object Detection Sensors

Figure 2:
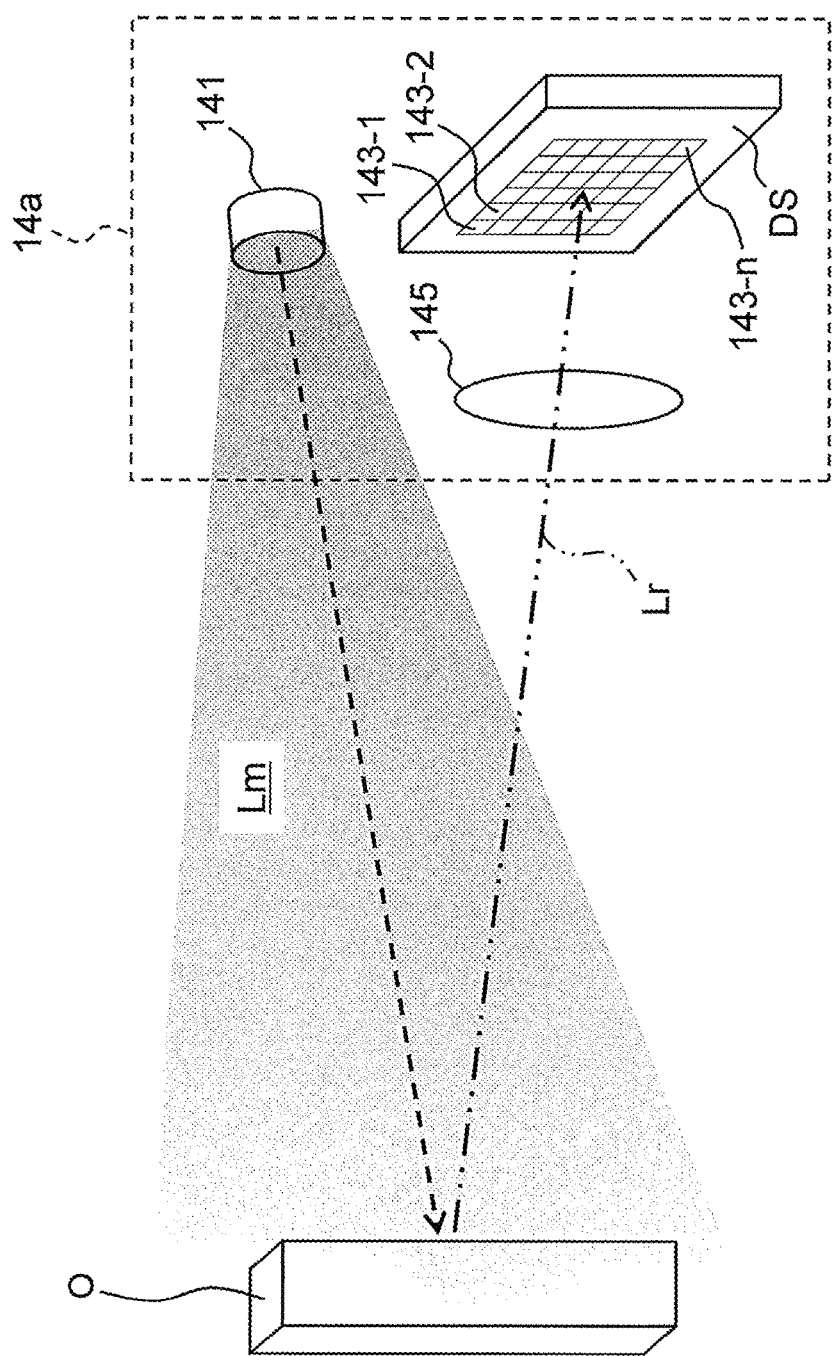
FIG. 2 is a diagram illustrating the configuration of an object detection sensor.

Next, the configurations of the object detection sensors 14a to 14d used in the object detection device 100 according to this embodiment will be described with reference to FIG. 2. FIG. 2 is a diagram illustrating the configuration of the object detection sensors. The four object detection sensors 14a to 14d have the same configurations, and thus the configuration of the object detection sensor 14a will be described below as an example.

The object detection sensor 14a includes an output unit 141. The output unit 141 is, for example, a light source that outputs measurement light Lm (one example of a first signal) of an infrared region toward an object O that is a detection target. As illustrated in FIG. 2, in this embodiment, the output unit 141 preferably outputs measurement light Lm expanded to a broad range of a space in which the moving body system 1 moves. This is so that the object detection sensor 14a can simultaneously detect objects O present in the broad range of the space in which the moving body system 1 moves.

The object detection sensors 14a includes a plurality of detection units 143-1, 143-2, . . . 143-n. Each of the plurality of detection units 143-1, 143-2, . . . 143-n, for example, is arranged at a predetermined position on a detection surface DS (semiconductor substrate) and detects reflected light Lr (one example of a second signal) generated when the measurement light Lm is reflected by the object O. Each of the detection units 143-1 to 143-n, for example, is a CCD (charge coupled device) or a CMOS (complementary MOS) device.

As illustrated in FIG. 2, the plurality of detection units 143-1 to 143-n are arranged on the detection surface DS in the vertical direction and the horizontal direction to form an array. In this way, the plurality of detection units 143-1 to 143-n can form CCD image sensors or CMOS image sensors on the detection surface DS.

To each of the plurality of detection units 143-1 to 143-n, a switching element (for example, a MOS-FET) used for connecting/disconnecting the detection unit and the control unit 15 disposed outside is connected. In addition, an address line is connected to the switching element, and when a signal is applied to the address line, the switching element is in the on state, and transmission/reception of signals can be executed between the detection unit connected to the switching element that is in the on state and the control unit 15.

The object detection sensor 14a includes a lens 145. The lens 145 condenses the reflected light Lr into an area of the detection surface DS in which the plurality of detection units 143-1 to 143-n are formed. In this way, the image of the object O present in a real space can be formed in the area in which the plurality of detection units 143-1 to 143-n are formed. By performing calibration in advance, the plurality of detection units 143-1 to 143-n and the real space are associated with each other.

By employing the configuration described above, the object detection sensor 14a can project the object O present in the real space onto predetermined coordinates in association with the detection units 143-1 to 143-n and acquire distance data. In other words, each of the detection units 143-1 to 143-n can detect the reflected light Lr generated when the measurement light Lm is reflected on the object O as a signal representing a distance to the object O present in an observed area and the shape of the object O.

(3) Configuration of Control Unit

Figure 3:
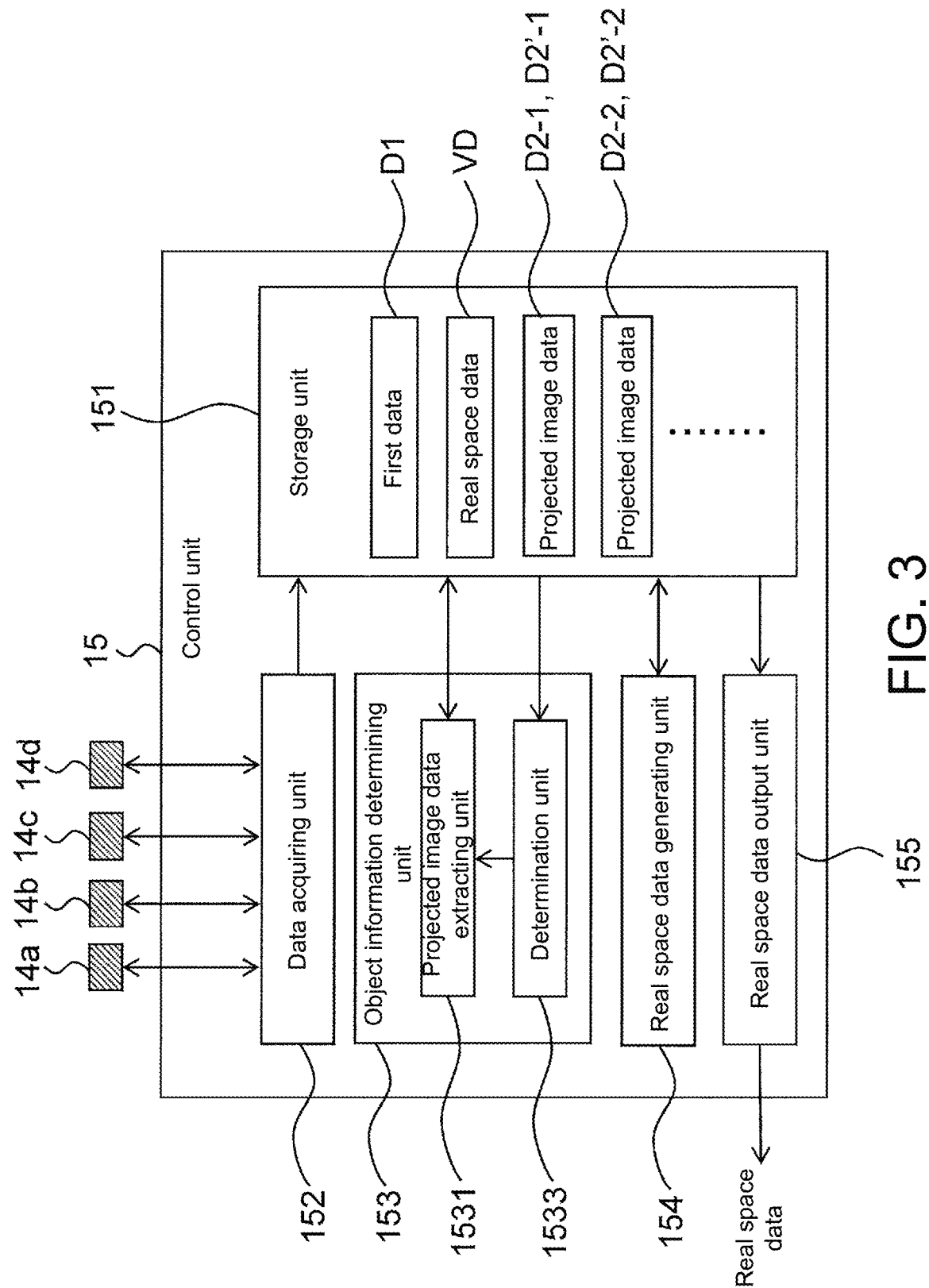
FIG. 3 is a diagram illustrating the configuration of a control unit.

Hereinafter, the configuration of the control unit 15 of the object detection device 100 according to this embodiment will be described with reference to FIG. 3. FIG. 3 is a diagram illustrating the configuration of the control unit. Some or all of the functions of each component of the control unit 15 to be described below may be realized as a program that is executable in a computer system configuring the control unit 15. In such a case, the program may be stored in a storage area formed in a storage device of the computer system. In addition, some or all of the functions of each component of the control unit 15 may be realized by hardware such as a custom IC or the like.

The control unit 15 includes a storage unit 151. The storage unit 151 is a part of a storage area, arranged in a storage device of the computer system, for example, which stores various kinds of data.

The control unit 15 includes a data acquiring unit 152. The data acquiring unit 152 generates a detection signal waveform represented as changes in the intensity of the reflected light Lr with respect time as first data D1. The first data D1 is an aggregate of a plurality of pieces of first position information in which coordinate values and a detection signal waveforms are associated with each other, wherein the coordinate values are acquired by projecting an arrangement position in the detection surface DS of the detection units 143-1 to 143-n into predetermined coordinates (they will be referred to as first coordinates), and the detection signal waveform represent changes in the reflected light Lr with respect to time in each detection unit.

Hereinafter, a case in which the first data D1 of the object detection sensor 14a is acquired will be described as an example. The data acquiring unit 152, first, applies a signal to an address line corresponding to the first detection unit 143-1 for a predetermined time that is a time in which the detection signal waveform described above can be acquired or more, thereby connecting the first detection unit 143-1 and the data acquiring unit 152 for the predetermined time.

During the connection between the detection unit 143-1 and the data acquiring unit 152, the data acquiring unit 152 inputs a signal (a voltage signal or a current signal) representing whether or not the detection unit 143-1 detects reflected light Lr at a time interval shorter than the predetermined time. As a result, the data acquiring unit 152 can acquire a detection signal waveform that is a change in the intensity (corresponding to the intensity of the reflected light Lr) of the signal representing whether or not the detection unit 143-1 detects reflected light Lr with respect time.

In addition, in a case in which reflected light Lr is not detected, there is no input of a signal from the detection unit 143-1, and thus the detection signal waveform is set to "0".

By sequentially changing an address line to which a signal is applied, the data acquiring unit 152 performs the process described above for all the other detection units 143-2 to 143-n, thereby acquiring n detection signal waveforms W1, W2, . . . Wn.

After the acquisition of the detection signal waveforms, the data acquiring unit 152 generates first data D1 as an aggregate of first position information (x1, y1, W1), (x2, y2, W2), . . . (xn, yn, Wn) by associating coordinate values (x1, y1), (x2, y2), . . . (xn, yn) acquired by projecting the arrangement position in the detection surface DS of the detection units 143-1 to 143-n onto first coordinates with corresponding detection signal waveforms W1 to Wn acquired by each detection unit.

The control unit 15 includes an object information determining unit 153. The object information determining unit 153 determines distances between the detection units 143-1 to 143-n and the object O and the arrangement states of the object O for the detection units 143-1 to 143-n on the basis of the detection signal waveforms W1 to Wn included in the first data D1.

Figure 4A:
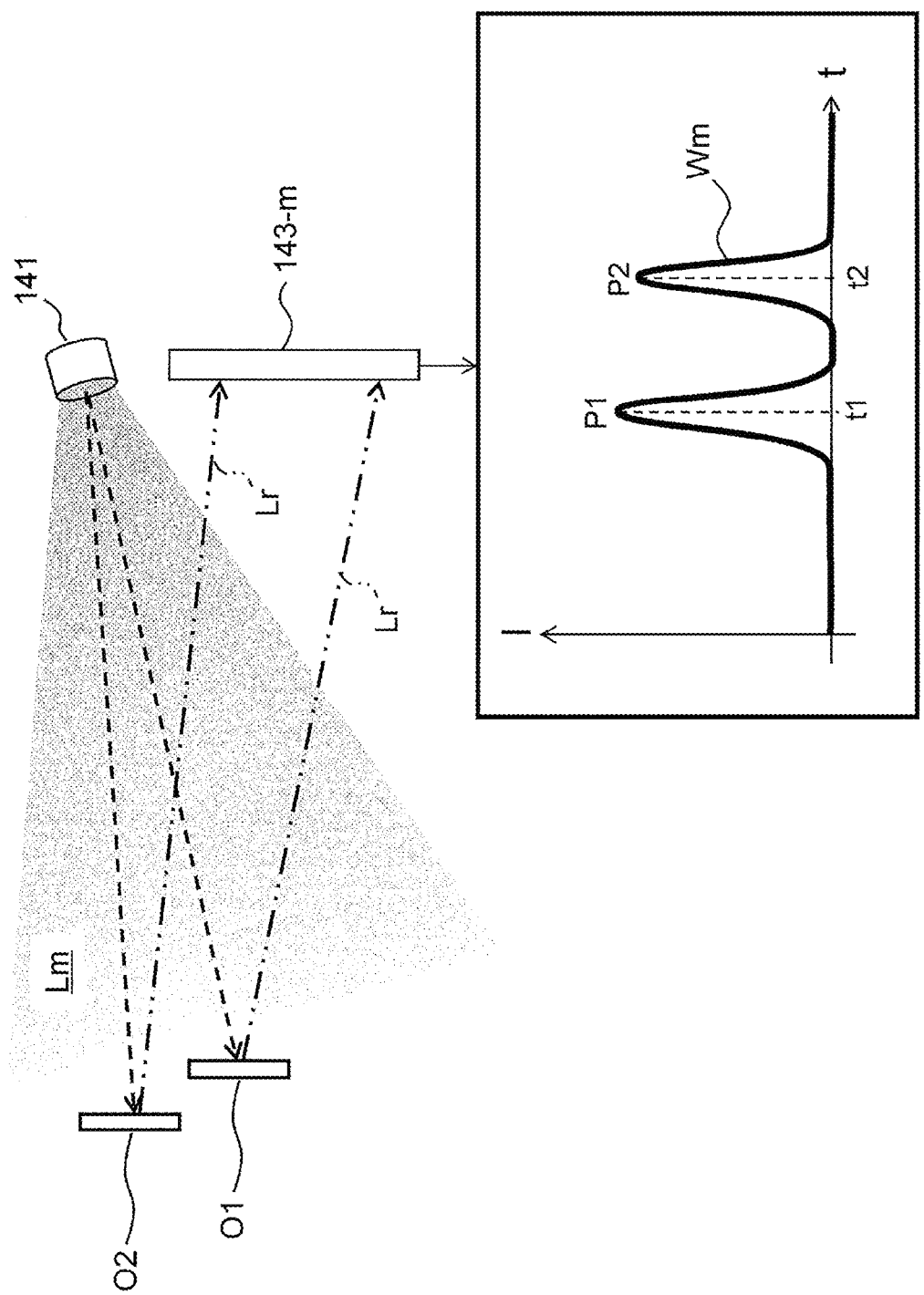
FIG. 4A is a diagram illustrating one example of a detection signal waveform of a case in which two objects are arranged at separate places.

For example, as illustrated in FIG. 4A, in a case in which the detection signal waveform Wm (the detection signal waveform acquired by the detection unit 143-m) has two maximum values P1 and P2 of the intensity of the reflected light Lr at time t1 and time t2, the object information determining unit 153 determines that the reflected light Lr is generated from two places having different distances. In other words, by setting time at which the measurement light Lm is output from the output unit 141 as "0," it is determined that objects O1 and O2 detected by the detection unit 143-*m* are arranged at a position of a distance c*t1/2 (here, c is the speed of light) and a position of a distance c*t2/2 in parallel with the detection surface DS. FIG. 4A is a diagram illustrating one example of a detection signal waveform of a case in which two objects are arranged at separate places.

In addition, the object information determining unit 153 determines that a boundary of two objects O1 is present at a position in a real space that corresponds to coordinate values on the first coordinates at which the detection signal waveform having two maximum values P1 and P2 appears, and an object O2 is present on a further rear side thereof.

In this way, in a case in which a plurality of maximum values of the intensity of the reflected light Lr are present in the detection signal waveform Wm, by determining that a plurality of objects having different distances from the detection unit 143-*d* are present, boundaries between a plurality of objects O can be determined with high accuracy without depending on the degree of integration and the like of the detection units 143-1 to 143-*n*.

Figure 4B:
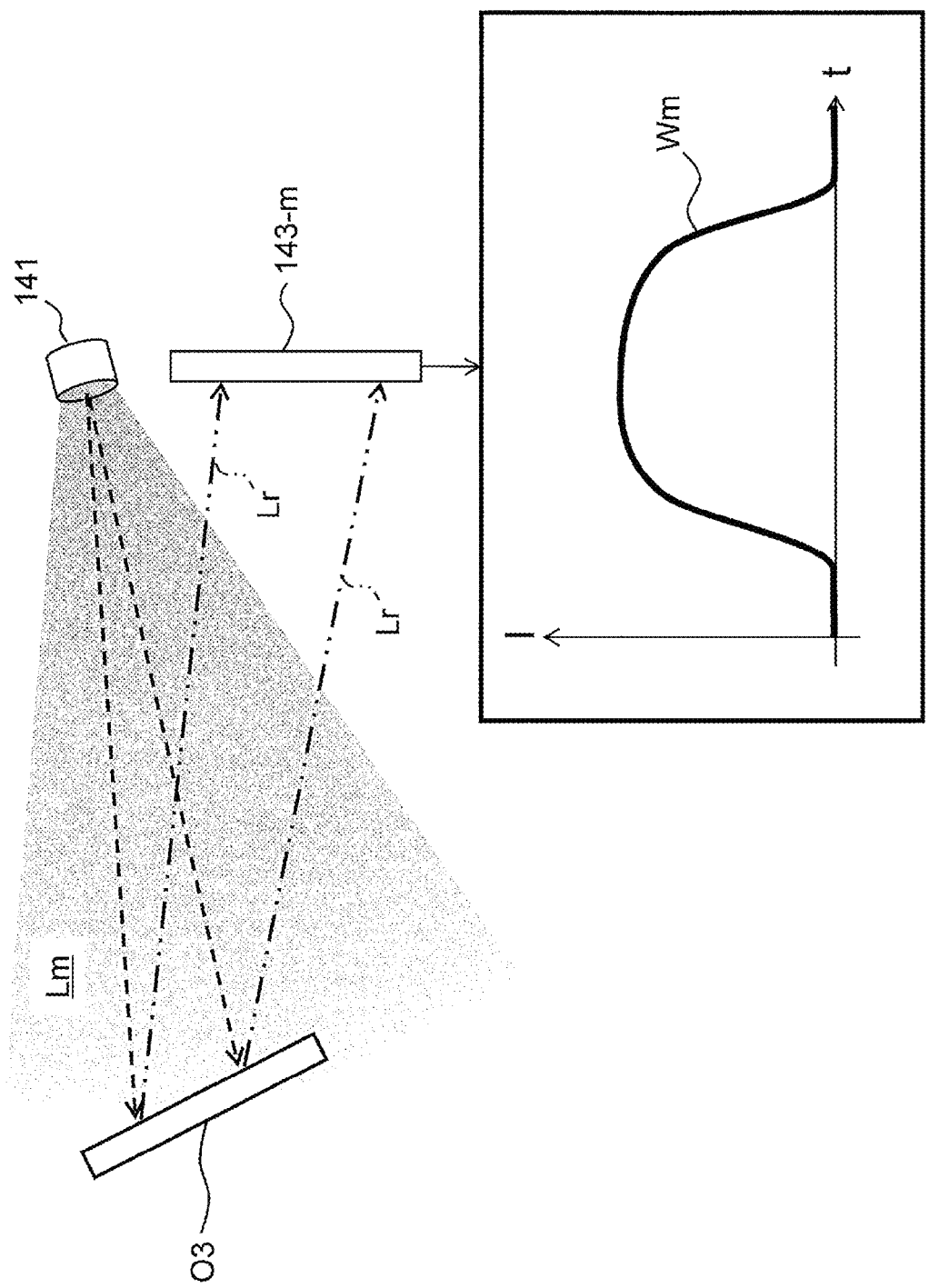
FIG. 4B is a diagram illustrating one example of a detection signal waveform of a case in which one object is inclined with respect to a detection surface.

On the other hand, for example, as illustrated in FIG. 4B, in a case in which the detection signal waveform Wm is a waveform having the intensity of the reflected light Lr being substantially fixed over a long time or a maximum value changing gently with respect to time, the object information determining unit 153 determines that a distance between a reflection face of an object O3 generating the reflected light Lr and the detection surface DS continuously changes. In other words, it is determined that one object O3 detected by the detection unit 143-*m* is inclined with respect to the detection surface DS. FIG. 4B is a diagram illustrating one example of a detection signal waveform of a case in which one object is inclined with respect to the detection surface.

In this way, in a case in which the detection signal waveform Wm has the intensity of the reflected light Lr being fixed over a long time or has a maximum value changing gently with respect to time, it is determined that an object inclined with respect to the detection unit 143-*m* is present, whereby it can be determined that one object O3 is arranged to be inclined with respect to the detection units 143-1 to 143-*n* (the detection surface DS) with high accuracy without depending on the degree of integration and the like of the detection units 143-1 to 143-*n*.

In this embodiment, in a case in which an object is detected by a plurality of detection units 143-1 to 143-*n*, the object information determining unit 153 determines a boundary between adjacent objects by using the characteristic of the detection signal waveform described above.

More specifically, the object information determining unit 153 includes a projected image data extracting unit 1531. The projected image data extracting unit 1531 extracts a plurality of pieces of first position information of which distances appearing in the detection signal waveform are within a predetermined range from the first data D1, thereby generating projected image data D2.

In this embodiment, the projected image data extracting unit 1531 extracts a first position information group associated with detection signal waveforms having non-zero intensities at time in a range of a predetermined value earlier or later than predetermined center time from the first data D1 as second position information, thereby generating projected image data D2. Such a process of extracting projected image data on the basis of distances up to an object from the detection units 143-1 to 143-*n* (object detection sensor 14*a*) will be referred to as a "first clustering process".

The object information determining unit 153 includes a determination unit 1533. The determination unit 1533 determines a boundary of the projected image data D2 by using the characteristic of the detection signal waveform described above. More specifically, the determination unit 1533, first, extracts a first detection signal waveform present on a line traversing two pieces of projected image data (they will be referred to as first projected image data and second projected image data) from the first projected image data and extracts a second detection signal waveform present on the line from the second projected image data. In this way, the determination unit 1533 can select two or more arbitrary detection units corresponding to the first projected image data and the second projected image data. This is because each pixel included in the projected image data D2 (first data D1) corresponds to one detection unit.

Next, the determination unit 1533 determines a boundary between the two pieces of the adjacent projected image data on the basis of a comparison between the first detection signal waveform and the second detection signal waveform that have been extracted. In other words, on the basis of a relation between the first detection signal waveform and the second detection signal waveform, the determination unit 1533 determines whether the two or more detection units selected as above correspond to the same object or different objects, thereby determining the presence range of the object O. Such a process of determining a boundary of projected image data on the basis of a comparison between detection signal waveforms will be referred to as a "second clustering process."

The second clustering process performed by the determination unit 1533 will be described later in detail.

By employing the configuration described above, in a case in which the detection surface DS includes a plurality of detection units 143-1 to 143-*n*, the object information determining unit 153 can determine a positional relation of a first object and a second object (the arrangement positions and arrangement states of the two objects) with high accuracy without depending on the degree of integration and the like of the plurality of detection units 143-1 to 143-*n*.

The control unit 15 includes a real space data generating unit 154. The real space data generating unit 154 generates real space data VD representing the arrangement position of an object O detected in a real space in which the moving body system 1 moves by using the projected image data D2 generated in the second clustering process.

The control unit 15 includes a real space data outputting unit 155. The real space data outputting unit 155 outputs the real space data VD to the moving body control unit 13.

Accordingly, in a case in which an object O that needs to be avoided such as an object O near the moving body system 1 is determined to be present, the moving body control unit 13 that has received the real space data VD can control the moving body system 1 instead of an operator of the moving body system 1 as is necessary by outputting a moving body control signal used for controlling the power function and the braking function of the brakes and/or the rotation function of the steering wheel, and the like.

For example, in a case in which an object O is determined to be present near the moving body system 1, the moving body control unit 13 stops the moving body system 1 (the main body 11) or cause the moving body system 1 to perform movement of avoiding the object O.

By employing the configuration described above, the control unit 15 can determine the arrangement state (boundary) of an object detected by the detection units 143-1 to 143-$n$ with high accuracy without depending on the degree of integration and the like of a plurality of the detection units 143-1 to 143-$n$ included in the object detection sensor 14$a$.

Figure 5:
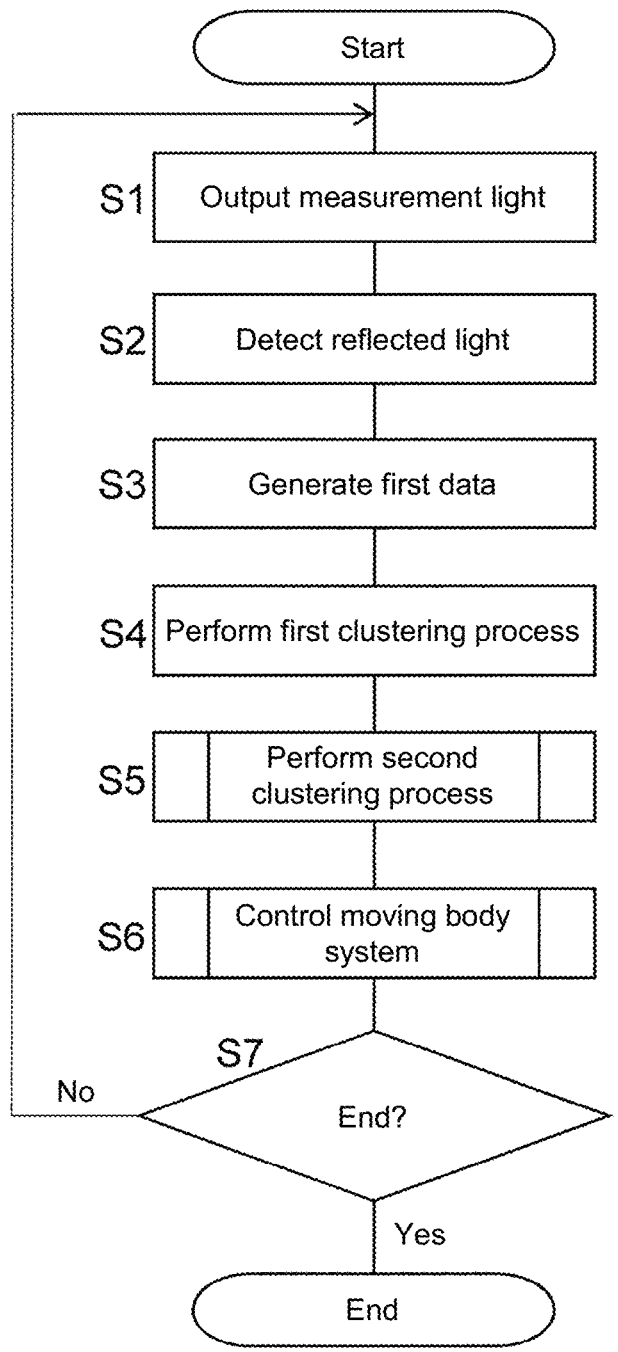
FIG. 5 is a flowchart illustrating the overall operation of an object detection device.

(4) Operation of Object Detection Device (4-1) Overall Operation of Object Detection Device Hereinafter, the operation of the object detection device 100 included in the moving body system 1 will be described. First, the overall operation of the object detection device 100 will be described with reference to FIG. 5. FIG. 5 is a flowchart illustrating the overall operation of the object detection device. In the following description, the four object detection sensors 14$a$ to 14$d$ have the same configurations, and thus the operation of the object detection sensor 14$a$ will be described below as an example.

For every predetermined time during the movement of the moving body system 1 in a real space, the data acquiring unit 152 directs the output unit 141 of the object detection sensor 14$a$ to output measurement light Lm (Step S1).

Almost simultaneously with the output of the measurement light Lm, the data acquiring unit 152 sequentially applies a signal to an address line corresponding to each detection unit of the object detection sensor 14$a$ and acquires a signal representing the intensity of reflected light Lr from the detection unit for a predetermined time, thereby acquiring a change in the intensity of the reflected light Lr detected by each detection unit with respect to time as a detection signal waveform (Step S2).

Thereafter, for the object detection sensor 14$a$, the data acquiring unit 152 generates an aggregate of a plurality of pieces of first position information by associating the acquired detection signal waveform with the coordinate values of each detection unit on the first coordinates, and stores the aggregate in the storage unit 151 as first data D1 (Step S3).

After the generation of the first data D1, the projected image data extracting unit 1531 extracts a first position information group associated with the detection signal waveform Wm having an intensity of non-zero at time within a range of a predetermined value earlier or later than predetermined center time from the first data D1 through the first clustering process as second position information, thereby generating projected image data D2 (Step S4).

Figure 6:
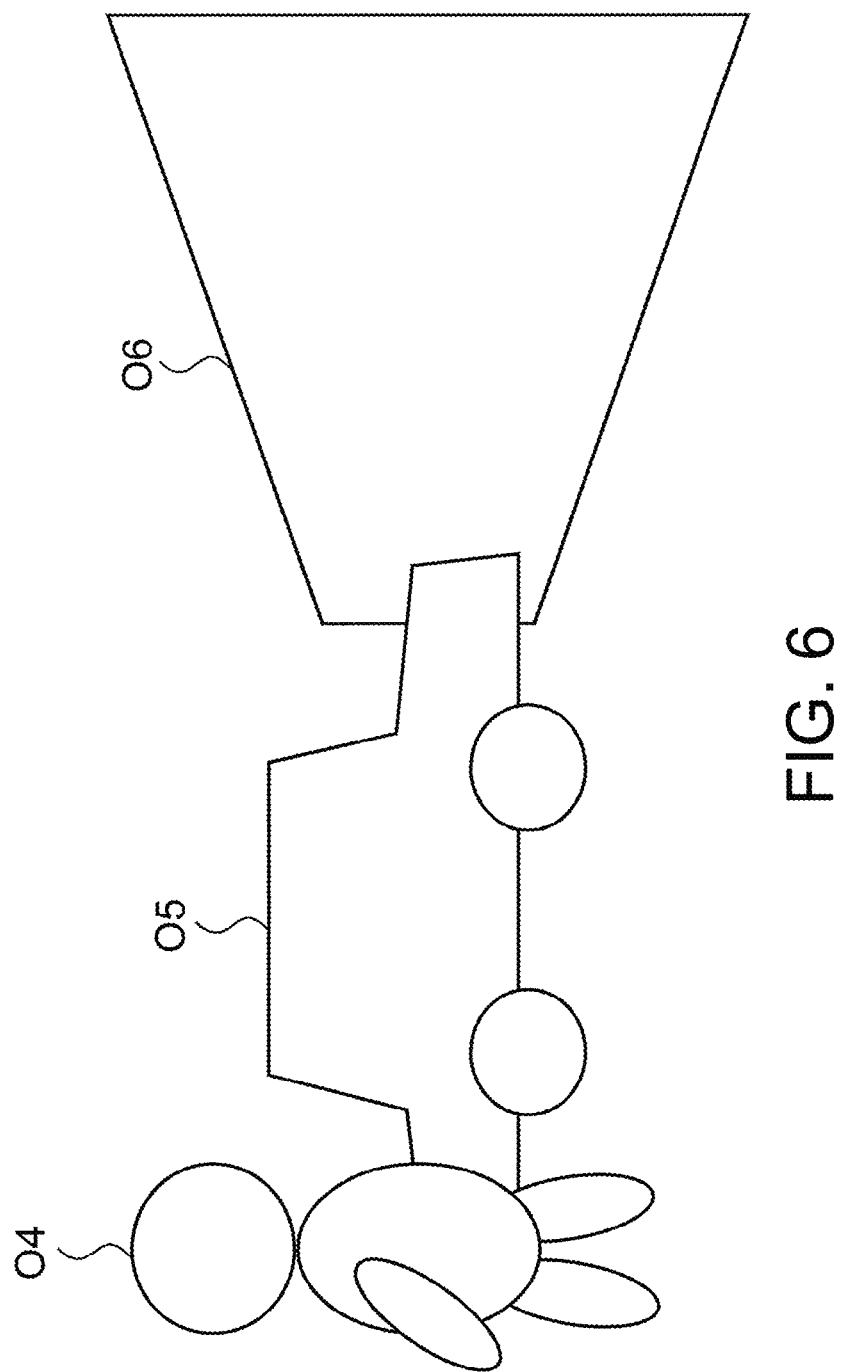
FIG. 6 is a diagram illustrating one example of objects in front of a moving body system.

For example, at the moment at which the object detection sensor 14$a$ outputs measurement light Lm, in front of the moving body system 1 in the straight forward direction, it is assumed that an object O4 (an object having the shape of a person), an object O5 (an object having the shape of a vehicle), and an object O6 (an object having a planar shape) as illustrated in FIG. 6 are present. FIG. 6 is a diagram illustrating one example of objects present in front of the moving body system.

Figure 7:
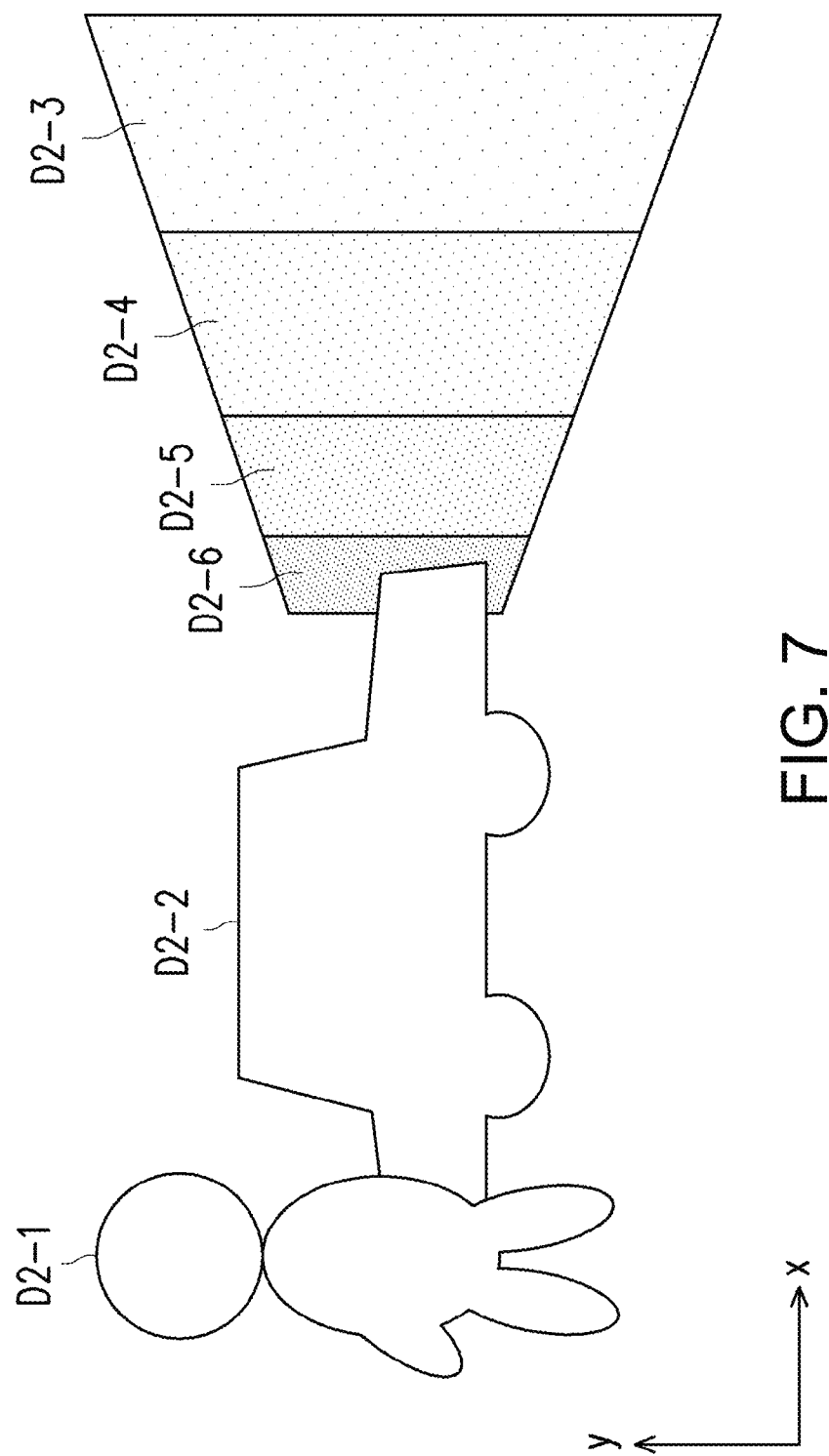
FIG. 7 is a diagram illustrating one example of projected image data extracted in a first clustering process.

In this case, by executing Steps S1 to S4 described above, the object detection sensor 14$a$, for example, is assumed to acquire a plurality of pieces of projected image data D2-1 to D2-6 on the basis of distances from the object detection sensor 14$a$ as illustrated in FIG. 7.

By the first clustering process, as illustrated in FIG. 7, the object O4 and the object O5 are respectively clustered as projected image data D2-1 and projected image data D2-2. Here, there is an overlapping portion between the projected image data D2-1 and the projected image data D2-2, and a boundary between the object O4 and the object O5 in the overlapping portion is not determined. In addition, there is an overlapping portion between the projected image data D2-2 and the projected image data D2-6, and a boundary in the overlapping portion is not determined.

Meanwhile, the object O6 is clustered as four pieces of projected image data D2-3 to D2-6 by the first clustering process. The first clustering process is a process of extracting data representing an object (or a part thereof) of which the distance from the detection surface DS is within a predetermined range as one piece of projected image data. Accordingly, in a case in which a plurality of pieces of projected image data D2-1 to D2-6 are generated, in the first clustering process, it cannot be determined whether the plurality of pieces of projected image data D2-1 to D2-6 represent a plurality of objects arranged at different positions from the detection surface DS in the distance direction (the Z axis direction of the real space) or one object extending to be inclined in the Z axis direction.

Accordingly, after the execution of the first clustering process in Step S4, in order to determine boundaries between the projected image data D2-1 to D2-6, the determination unit 1533 performs a second clustering process of determining the boundaries between the projected image data D2-1 to D2-6 using the characteristic of the detection signal waveform described above (Step S5). The second clustering process will be described later in detail.

After the execution of the second clustering process, the control unit 15 executes control of the moving body system 1 using the projected image data D2 of which the boundary is determined by the second clustering process (Step S6). The control of the moving body system 1 executed in Step S6 will be described later in detail.

After the execution of Steps S1 to S6 described above, unless the operation of the object detection device 100 is directed to stop by an operator of the moving body system 1 or the like (in case of "No" in Step S7), the process is returned to Step S1, and the object detection device 100 continues to operate.

On the other hand, in a case in which the operation of the object detection device 100 is directed to stop by the operator of the moving body system 1 or the like (in the case of "Yes" in Step S7), the object detection device 100 stops the operation.

By executing Steps S1 to S7 described above, boundaries between objects detected by the object detection sensor 14$a$ can be determined with high accuracy without depending on the degree of integration or the like of the plurality of detection units 143-1 to 143-$n$ included in the object detection sensor 14$a$.

(4-2) Second Clustering Process

Figure 8:
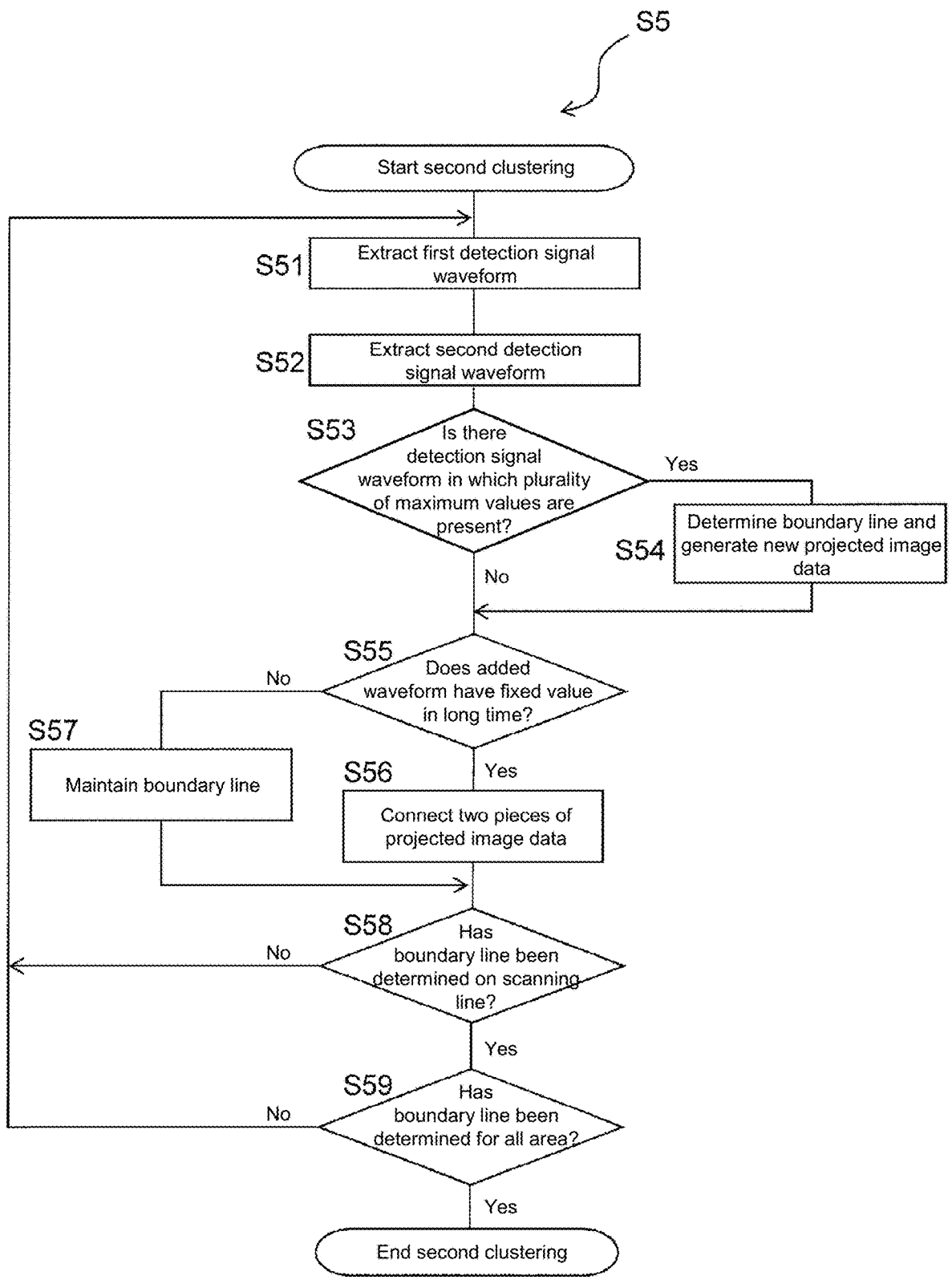
FIG. 8 is a flowchart illustrating the flow of a second clustering process.

Next, the second clustering process executed in Step S5 described above will be described with reference to FIG. 8. FIG. 8 is a flowchart illustrating the flow of the second clustering process.

In the second clustering process to be described below, the determination unit 1533, in this embodiment, scans the second position information included in the projected image data D2 in an x axis direction of the first coordinates, thereby determining the boundary of the projected image data D2.

Figure 9:
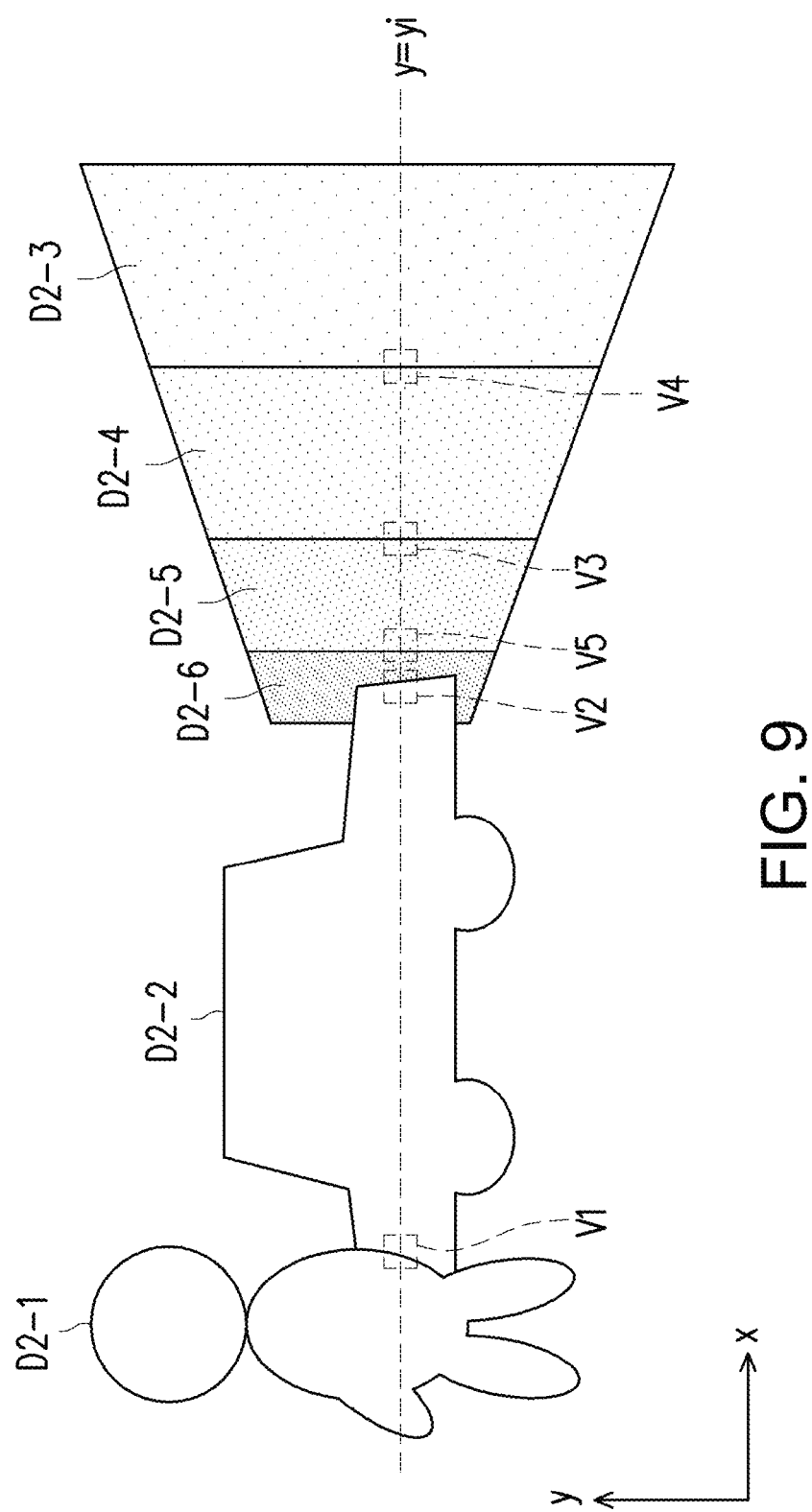
FIG. 9 is a diagram illustrating one example of a scanning direction when a boundary of projected image data is determined.

More specifically, as denoted by a dotted line in FIG. 9, in a case in which the y coordinate value of the second position information included in the projected image data D2 is set to yi, and the x coordinate value thereof is changed in the positive direction, first, the determination unit 1533 selects projected image data D2-1 as first projected image data and selects projected image data D2-2 as second projected image data in order of smallest to largest x coordinate value. FIG. 9 is a diagram illustrating one example of the scanning direction when a boundary of projected image data is determined.

After the selection of the first projected image data and the second projected image data, the determination unit 1533 extracts a plurality of pieces of second position information on a line represented by a function of y=yi from the first projected image data and extracts a detection signal waveform associated with each piece of the second position information that has been extracted as a first detection signal waveform (Step S51). In this way, one or more detection units that have detected the detection signal waveform included in the first projected image data are selected.

In addition, the determination unit 1533 extracts a plurality of pieces of second position information on a line represented by a function of y=yi from the second projected image data D2-2 and extracts a detection signal waveform associated with each piece of the second position information that has been extracted as a second detection signal waveform (Step S52). Accordingly, one or more detection units that have detected a detection signal waveform included in the second projected image data are selected.

After a plurality of first detection signal waveforms and a plurality of second detection signal waveforms are extracted, the determination unit 1533 compares the plurality of first detection signal waveforms with the plurality of second detection signal waveforms (Step S53).

For example, in the vicinity V1 of a boundary between the first projected image data D2-1 and the second projected image data D2-2, detection signal waveforms W(x1, yi), W(x2, yi), and W(x3, yi) associated with the coordinate values (x1, yi), (x2, yi), and (x3, yi) of the second position information are assumed to be extracted as first detection signal waveforms. In other words, three detection units arranged at the coordinate values (x1, yi), (x2, yi), and (x3, yi) of the first coordinate are assumed to respectively have detected first detection signal waveforms W(x1, yi), W(x2, yi), and W(x3, yi).

In addition, in the vicinity V1 of the boundary, detection signal waveforms W(x4, yi) and W(x5, yi) respectively associated with coordinate values (x4, yi) and (x5, yi) of the second position information are assumed to be extracted as second detection signal waveforms. In other words, two detection units arranged at coordinate values (x4, yi) and (x5, yi) of the first coordinates are assumed to respectively have detected second detection signal waveforms W(x4, yi) and W(x5, yi).

For the first detection signal waveforms and the second detection signal waveforms extracted as described above, the determination unit 1533 determines whether two or more arbitrary detection units that have detected the first detection signal waveforms and the second detection signal waveforms correspond to either the same object or different objects on the basis of the first detection signal waveforms and shape patterns of the first detection signal waveforms. More specifically, as a result of comparison between of the first detection signal waveform and the second detection signal waveform, for example, as illustrated in FIG. 10A, in a case in which it is determined that the first detection signal waveform W(x3, yi) detected by one detection unit has two maximum values at time t3 and time r4, and the detection signal waveform detected by another detection unit has one maximum value (in the case of "Yes" in Step S53), the determination unit 1533 determines that a boundary between the first projected image data D2-1 and the second projected image data D2-2 is present at the coordinate values (x3, yi) of the first coordinates.

Figure 10A:
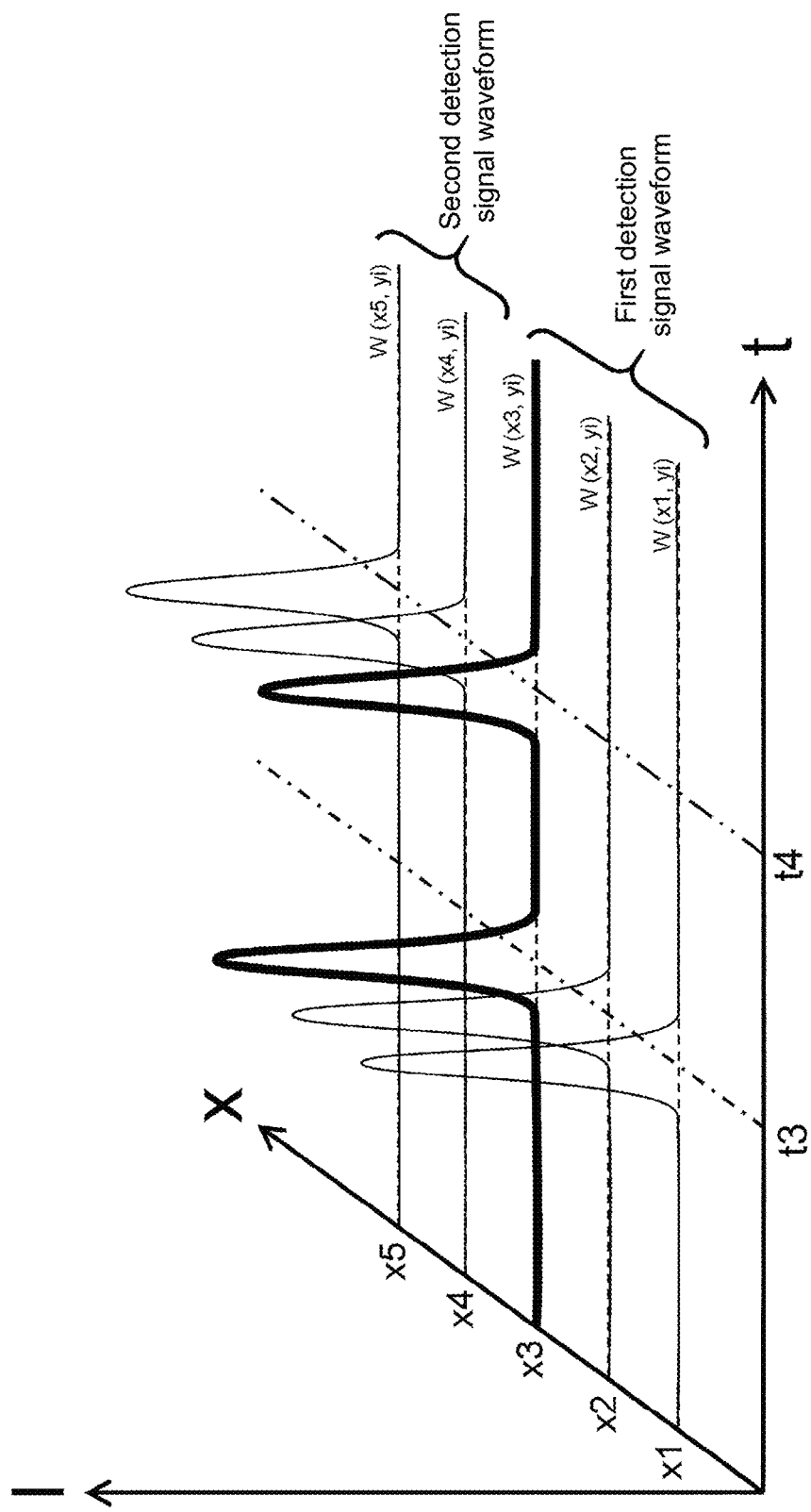
FIG. 10A is a diagram illustrating one example of a plurality of detection signal waveforms in the vicinity of a boundary in a case in which one detection signal waveform having two maximum values is present.

FIG. 10A is a diagram illustrating one example of a plurality of detection signal waveforms near a boundary of a case in which one detection signal waveform having two maximum values is present.

As illustrated in FIG. 10A, time t3 at which maximum intensities are in the first detection signal waveforms W(x1, yi) and W(x2, yi) detected by the other detection units are taken coincides with time t3 at which one maximum among two maximums included in the first detection signal waveform W(x3, yi) is taken. In such a case, the determination unit 1533 determines that the detection units that have detected the first detection signal waveforms W(x1, yi), W(x2, yi), and W(x3, yi) correspond to the same object O4 (first object).

In addition, similarly, time t4 at which maximums of the intensities of the second detection signal waveforms W(x4, yi) and W(x5, yi) detected by the other detection units are taken coincides with time t4 at which one maximum among two maximums included in the first detection signal waveform W(x3, yi) is taken. In such a case, the determination unit 1533 determines that the detection units that have detected the first detection signal waveform W(x3, yi), the second detection signal waveform W(x4, yi), and the second detection signal waveform W(x5, yi) correspond to the same object O5 (second object).

In this way, the determination unit 1533 can determine the presence ranges of the objects O4 and O5 when the boundary of the object O4 is present at a position in a real space that corresponds to the coordinate value (x3, yi) on the first coordinates at which the detection signal waveform W(x3, yi) having two maximum values (maximum values represented at time t3 and time t4) appears and an object O5 is present on a rear side thereof.

In addition, the range that can be detected by one detection unit of the object detection sensor 14a generally expands. In other words, the waveform acquired by the object detection sensor 14a represents intensities of reflected light Lr detected within the range of x3'<x3<x3" and yi'<yi<yi."

Accordingly, in this embodiment, the determination unit 1533, for example, determines a center point ((x3'+x3")/2, (yi'+yi")/2) of the area described above as a coordinate point at which a boundary between the first projected image data D2-1 and the second projected image data D2-2 is present.

After the coordinate point at which the boundary is present is determined as above, the determination unit 1533, for example, replaces x3 of the second position information (x3, yi, W(x3, yi)) of the first projected image data D2-1 with (x3'+x3")/2 and replaces yi with (yi'+yi")/2, thereby determining the boundary of the first projected image data D2-1.

In addition, ((x3'+x3")/2, (yi'+yi")/2, W(x3, yi)) that is new second position information is added to the second projected image data D2-2, whereby the boundary of the second projected image data D2-2 is determined (Step S54).

As described above, in a case in which any one of the first detection signal waveform and the second detection signal waveform (in the example described above, the first detection signal waveform W(x3, yi)) has two maximums corresponding to a first object and a second object, the object information determining unit 153 (the determination unit 1533) determines that the first object (the object O4) and the second object (the object O5) are separate objects having different distances from the detection units 143-1 to 143-n, and accordingly, the first object and the second object can be determined as separate objects with high accuracy without depending on the degree of integration or the like of the detection units 143-1 to 143-*n*.

Figure 10B:
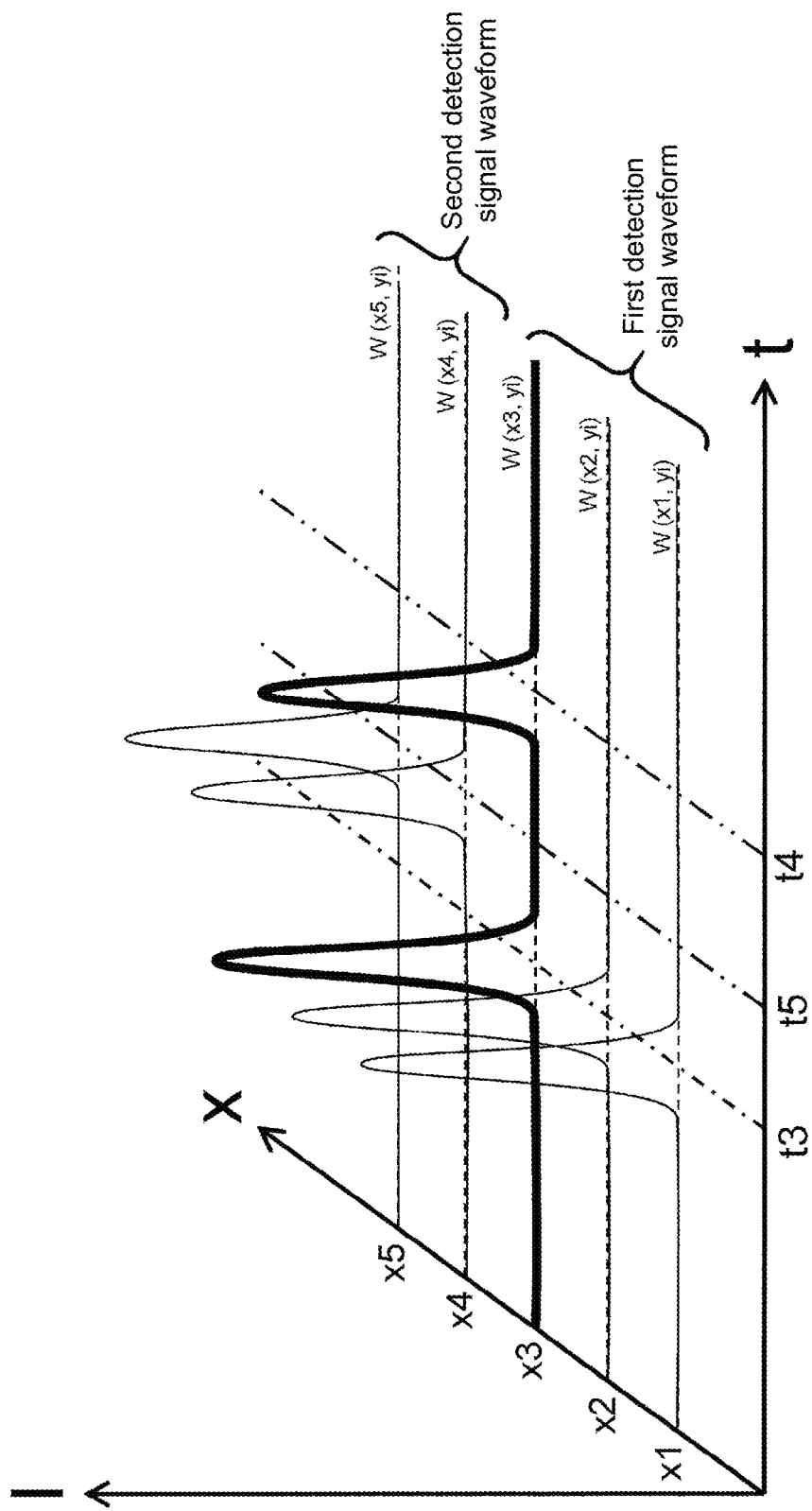
FIG. 10B is a diagram illustrating one example of a plurality of detection signal waveforms in a case in which three objects arranged at different positions are detected.

On the other hand, as illustrated in FIG. 10B, in a case in which time for taking maximums of the intensities in the detection signal waveforms (x4, yi) and W(x5, yi) detected by the other detection units (time t5 in the case illustrated in FIG. 10B) does not coincide with any one of times at which two maximums present in the detection signal waveform W(x3, yi) detected by one detection unit are taken (time t3 and time t4), a plurality of the detection units are determined to correspond to different objects. FIG. 10B is a diagram illustrating one example of a plurality of detection signal waveforms of a case in which three objects arranged at different positions are detected.

More specifically, a detection unit that has detected first detection signal waveforms W(x1, yi), W(x2, yi), and W(x3, yi) correspond to one object present at a distance corresponding to time t3, a detection unit that has detected a first detection signal waveform W(x3, yi) corresponds to one small object (detected only by one detection unit) present at a distance corresponding to time t4, and a detection unit that has detected second detection signal waveforms W(x4, yi) and W(x5, yi) corresponds to one object present at a distance corresponding to time t5. In other words, the presence ranges of three objects arranged at different distances from the detection surface DS are determined by the five detection units described above.

On the other hand, in a case in which a detection signal waveform having two maximum values is not present (in the case of "No" in Step S53), the determination unit 1533 calculates an added waveform W' by adding the first detection signal waveform and the second detection signal waveform that have been extracted (Step S55).

Figure 10C:
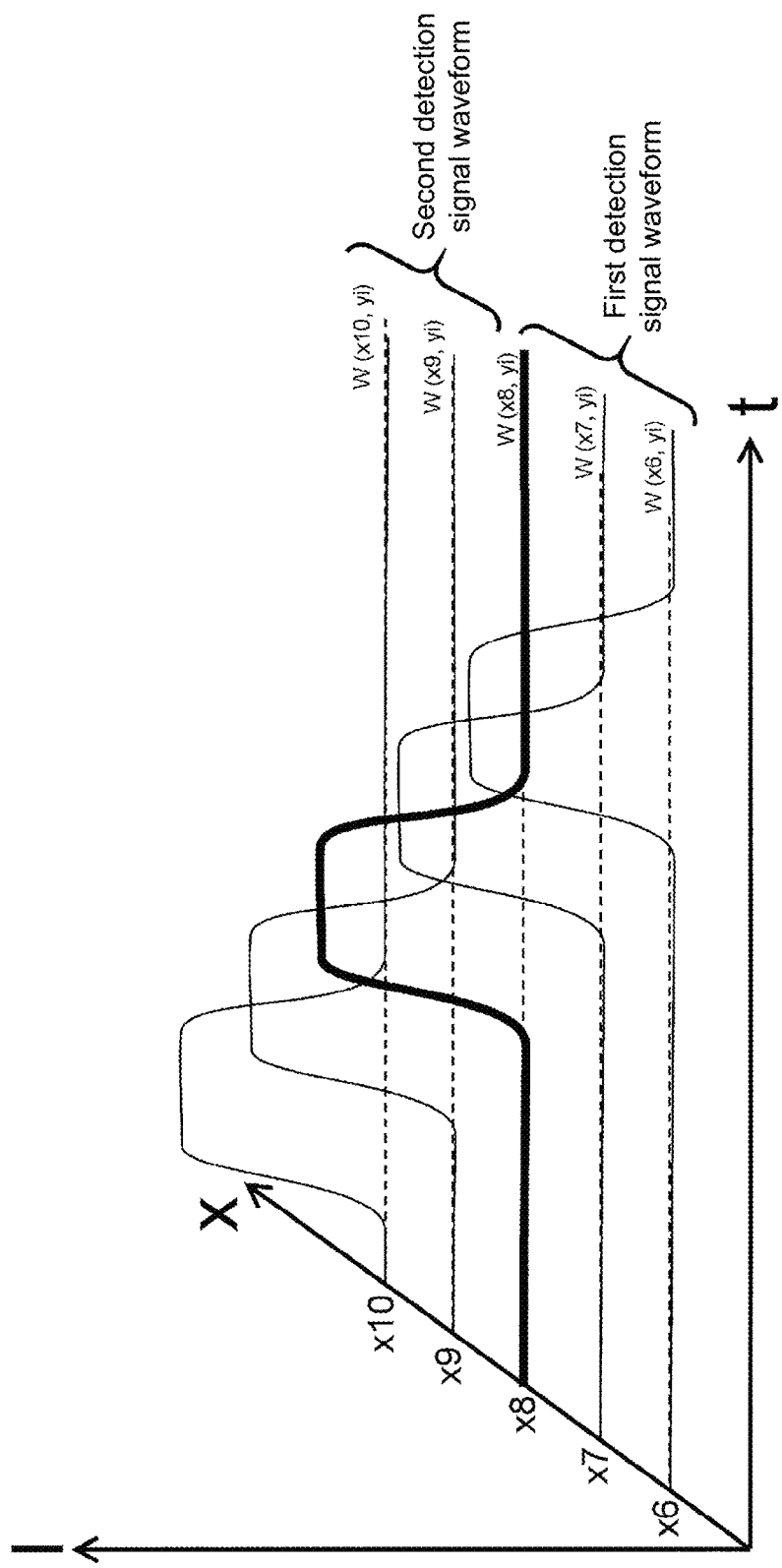
FIG. 10C is a diagram illustrating one example of a case in which a detection signal waveform of which the intensity has a fixed value for a long time is present.

For example, in the vicinity V3 of a boundary between projected image data D2-5 (first projected image data) and projected image data D2-4 (second projected image data), as illustrated in FIG. 10C, it is assumed that first detection signal waveforms and second detection signal waveforms W(x6, yi) to W(x10, yi), of which the intensities have fixed values for a long time, not having two maximum values are extracted, and time periods in which the detection signal waveforms W(x6, yi) to W(x10, yi) of which the intensities have fixed values for a long time are generated overlap each other. In addition, it is determined that a boundary between projected image data D2-5 and projected image data D2-4 is determined to be present at coordinate values (x8, yi) of the first coordinates by the first clustering process. FIG. 10C is a diagram illustrating one example of a case in which a detection signal waveform of which the intensity has a fixed value for a long time is present.

Figure 11:
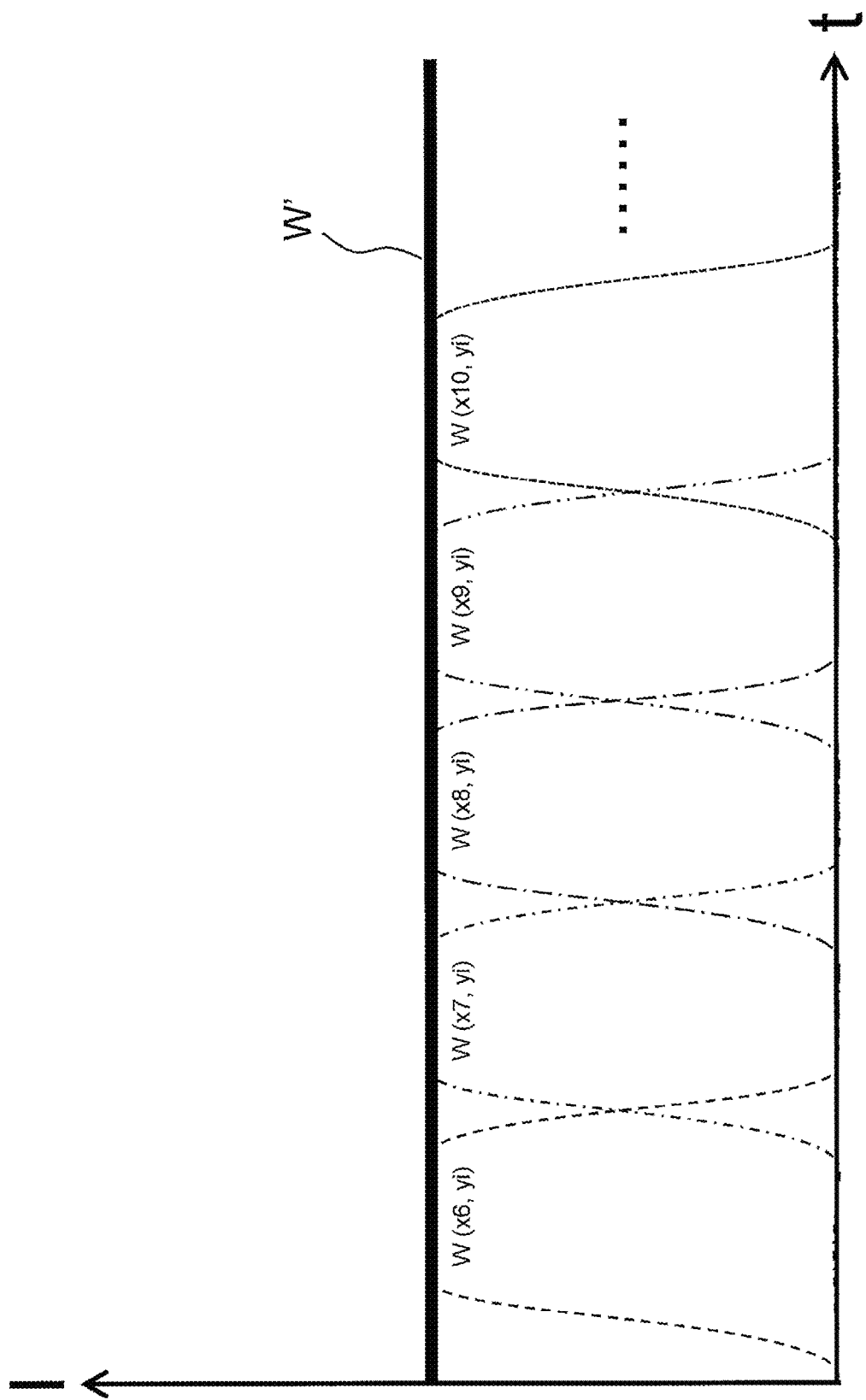
FIG. 11 is a diagram illustrating one example of a case in which an added waveform having a fixed intensity over a long time is calculated.

In a case in which first detection signal waveforms and second detection signal waveforms as illustrated in FIG. 10C are extracted, when the first detection signal waveforms and the second detection signal waveforms are added, an added waveform W' having a fixed intensity over a long time as illustrated in FIG. 11 is calculated.

In a case in which the added waveform W' having a fixed intensity over a long time as illustrated in FIG. 11 is calculated (in the case of "Yes" in Step S55), the determination unit 1533 determines that detection units that have detected the detection signal waveforms W(x6, yi) to W(x10, yi) correspond to the same object. In other words, the determination unit 1533 determines that a boundary between the projected image data D2-5 and the projected image data D2-4 is not present at the coordinate values (x8, yi) of the first coordinates and the two pieces of the projected image data D2-4 and D2-5 are data for one object. In this case, the determination unit 1533, for example, connects (integrates) the two pieces of the projected image data D2-5 and D2-4 and generates new one piece of projected image data D2 for one object at y=yi (Step S56).

FIG. 11 is a diagram illustrating one example of a case in which an added waveform having a fixed intensity over a long time is calculated.

In addition, in this embodiment, the first detection signal waveforms and the second detection signal waveforms as illustrated in FIG. 10C are acquired also in the vicinity V4 of the boundary between the projected image data D2-4 and the projected image data D2-3 and the vicinity V5 of the boundary between the projected image data D2-6 and the projected image data D2-5, and accordingly, the determination unit 1533, finally, can generate new one piece of projected image data D2 at y=yi for an object O6 by connecting four pieces of the projected image data D2-3 to D2-6.

In this way, the determination unit 1533 can determine the presence range of the object O6.

Figure 10D:
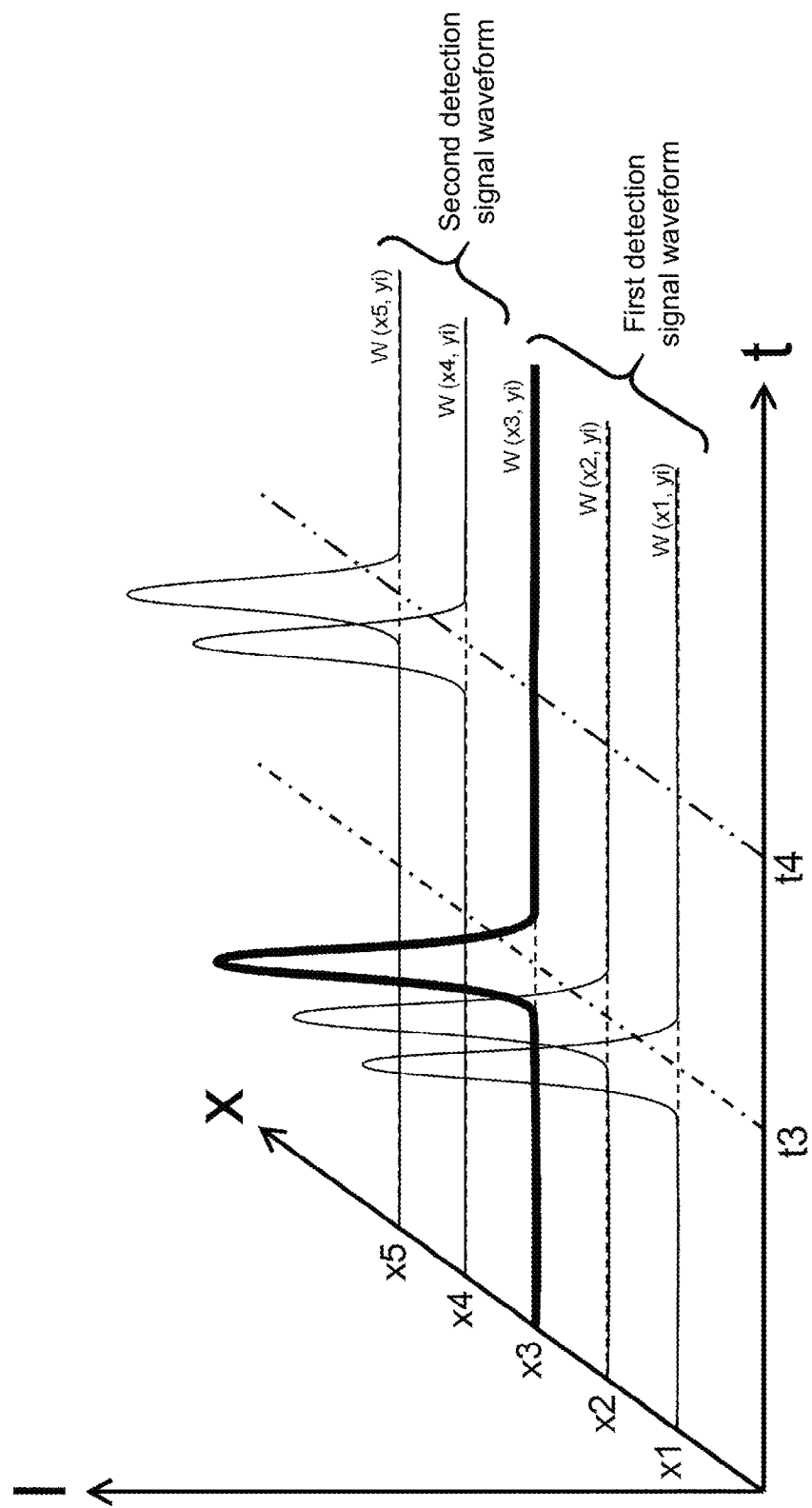
FIG. 10D is a diagram illustrating one example of a case in which a time at which one maximum value of a first detection signal waveform appears does not coincide with a time at which one maximum value of a second detection signal waveform appears, and two objects are detected by a plurality of detection units.

On the other hand, in a case in which an added waveform W' of which the intensities are fixed over a long time is not calculated (in the case of "No" in Step S55), for example, as illustrated in FIG. 10D, in a case in which each of the first detection signal waveform and the second detection signal waveform that have been extracted has only one maximum value, and time at which one maximum value of the first detection signal waveform appears (time t3) does not coincide with time at which one maximum value of the second detection signal waveform appears (time t4), the determination unit 1533 maintains the boundary between the two pieces of the projected image data determined by the first clustering process and determines that detection units that have detected the first detection signal waveforms and the second detection signal waveforms correspond to two objects (Step S57).

FIG. 10D is a diagram illustrating one example of a case in which time at which one maximum value of a first detection signal waveform appears does not coincide with time at which one maximum value of a second detection signal waveform appears, and two objects are detected by a plurality of detection units.

Figure 10E:
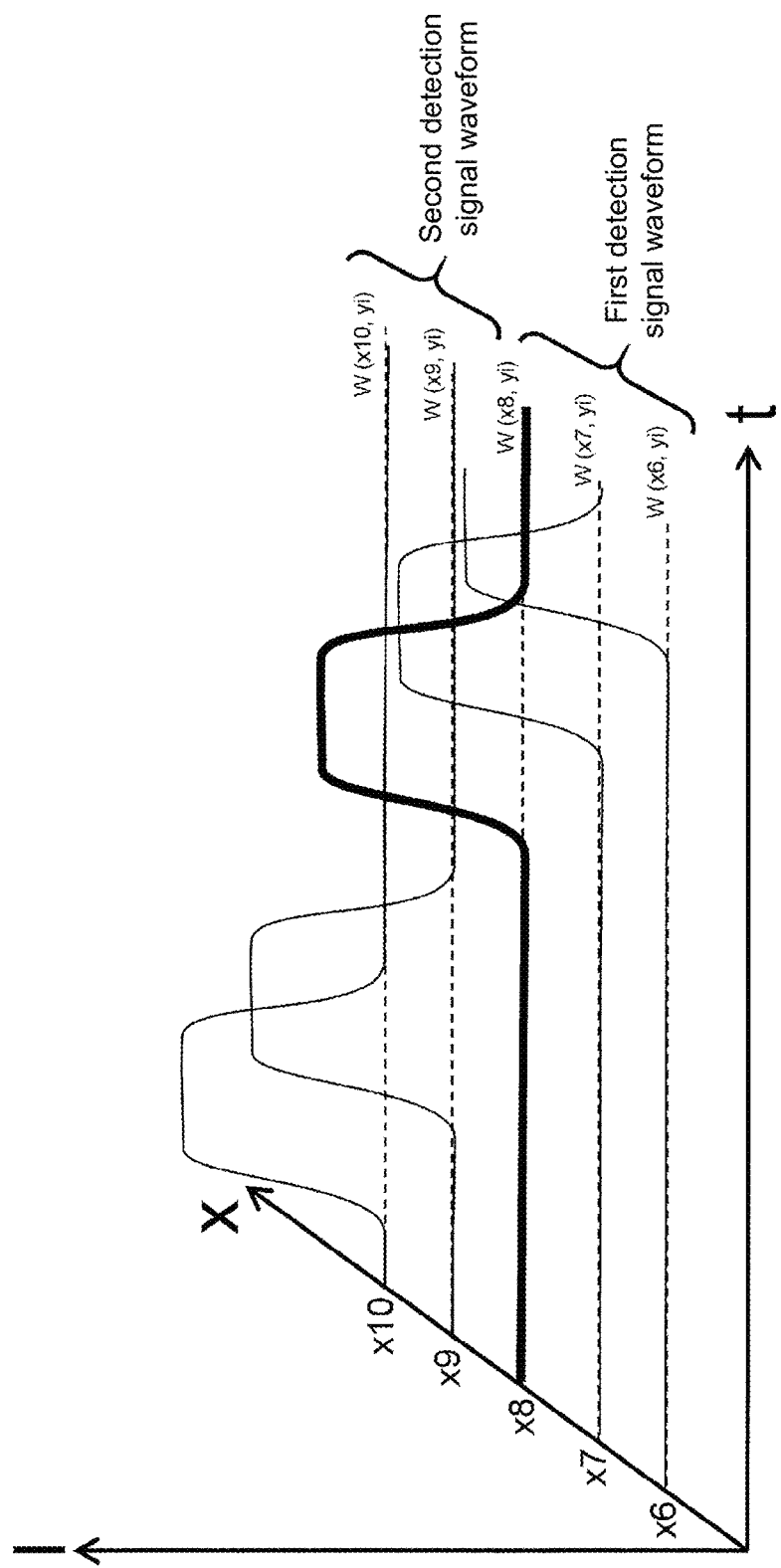
FIG. 10E is a diagram illustrating one example of a case in which a time period in which a first detection signal waveform is generated does not coincide with a time period in which a second detection signal waveform is generated, and two objects are detected by a plurality of detection units.

In addition, as illustrated in FIG. 10E, also in a case in which the intensities of the first detection signal waveforms and the second detection signal waveforms are fixed over a long time, and a time period in which the first detection signal waveform is generated and a time period in which the second detection signal waveform is generated do not overlap with each other, the determination unit 1533 determines that detection units that have detected the first detection signal waveforms and the second detection signal waveforms correspond to different objects.

More specifically, in the case illustrated in FIG. 10E, a time period in which the first detection signal waveform W(x8, yi) is generated and a time period in which the second detection signal waveform W(x9, yi) is generated do not overlap with each other. In this case, the determination unit 1533 determines the presence ranges of the two objects when detection units that have detected the first detection signal waveforms W(x6, yi) to W(x8, yi) correspond to one object that is inclined with respect to the Z axis direction of the real space and detection units that have detected the second detection signal waveforms W(x9, yi) and W(x10, yi) correspond to another one object that is inclined with respect to the Z axis direction of the real space.

FIG. 10E is a diagram illustrating one example of a case in which a time period in which a first detection signal waveform is generated does not coincide with a time period in which a second detection signal waveform is generated, and two objects are detected by a plurality of detection units.

Figure 12:
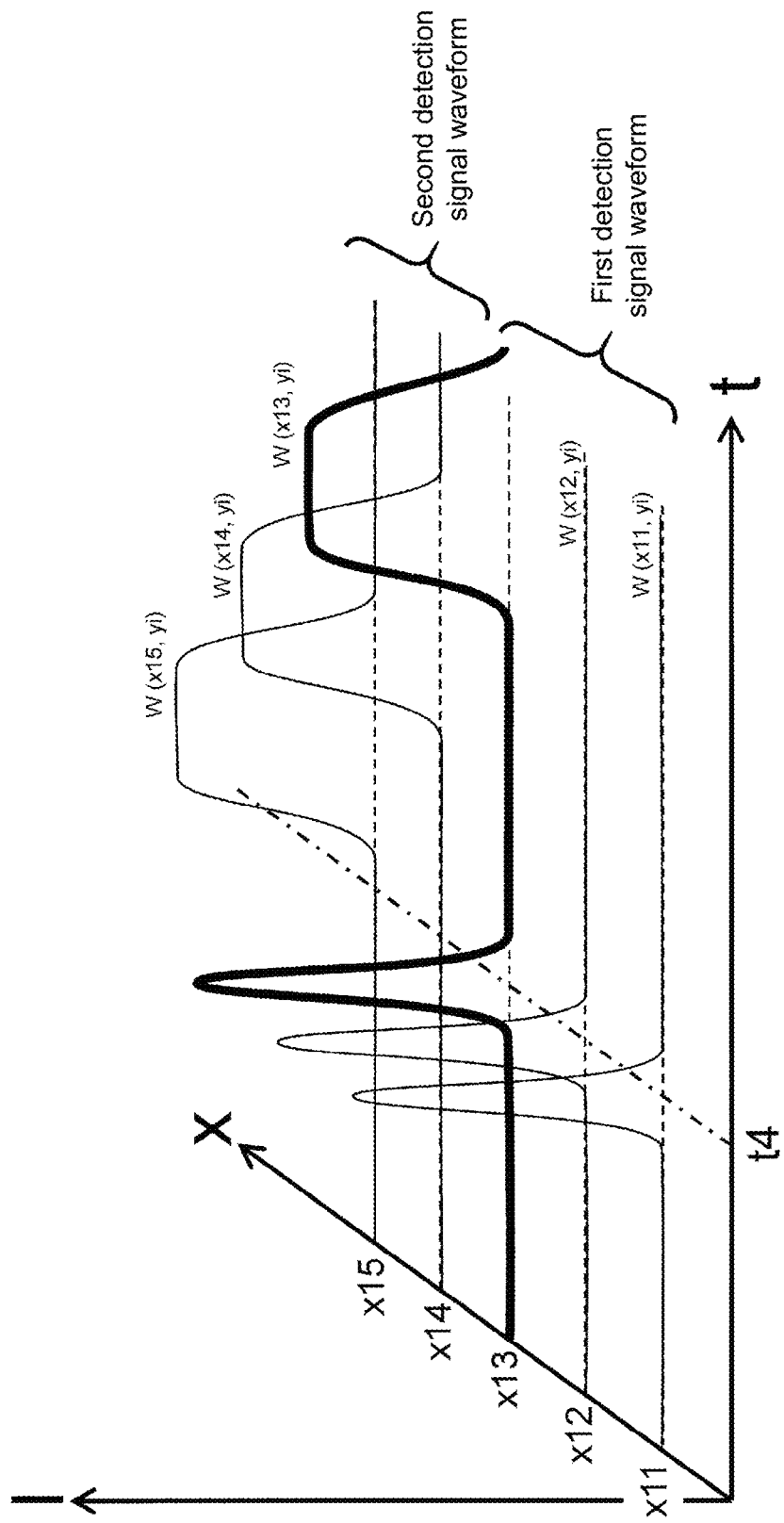
FIG. 12 is a diagram illustrating an example of a case in which detection signal waveforms having two different waveforms are present in the vicinity of a boundary.

In addition, for example, in a vicinity V2 of the boundary between projected image data D2-2 (first projected image data) and projected image data D2-6 (second projected image data), as illustrated in FIG. 12, two first detection signal waveforms W(x11, yi) and W(x12, yi) having one maximum value only at time t4 are present, and two second detection signal waveforms W(x14, yi) and W(x15, yi) of which the intensities have fixed values over a long time are present. In addition, a first detection signal waveform W(x13, yi) having two different waveforms is present.

FIG. 12 is a diagram illustrating a case in which detection signal waveforms having two different waveforms are present in the vicinity of a boundary.

In such a case, by executing Steps S51 to S57 described above, the determination unit 1533 can determine that a boundary between first projected image data D2-2 and second projected image data D2-6 is present at coordinate values (x13, yi) of the first coordinates and determine that an object represented by the second projected image data D2-6 is an inclined object.

In addition, for example, in a case in which a plurality of detection signal waveforms having a plurality of maximum values are continuously present in the x axis direction or in a case in which a plurality of detection signal waveforms representing a fixed value over a long time are continuously present without shifting the time, it is considered that boundaries between a plurality of pieces of projected image data are present along the x axis or the face of an object represented by the projected image data is approximately parallel with the x axis.

In such a case, the determination unit 1533, for example, may scan the detection signal waveform in the direction of a y axis perpendicular to the x axis. Accordingly, the determination unit 1533 may determine a boundary between a plurality of pieces of projected image data approximately parallel with the x-axis direction or an inclination of an object.

After the execution of Steps S51 to S57 described above, the determination unit 1533 determines whether or not boundaries between all the projected image data D2-1 to D2-6 on the line of y=yi have been determined (Step S58).

In a case in which Steps S51 to S57 described above have not been executed for all the x coordinate values on the line of y=yi (in the case of "No" in Step S58), it is determined that an x coordinate value for which a boundary to be determined on the line of y=yi is present, and the second clustering process is returned to Step S51.

On the other hand, in a case in which Steps S51 to S57 described above have been executed for all the x coordinate values on the line of y=yi (in the case of "Yes" in Step S58), the determination unit 1533 further determines whether or not boundaries between the projected image data have been determined for all the areas of the first coordinates (in other words, a plurality of detection units 143-1 to 143-n) (Step S59).

In a case in which Steps S51 to S57 described above have not been executed for all the y coordinate values (in the case of "No" in Step S59), a y coordinate value for which a boundary is to be determined is assumed to be present, and the second clustering process is returned to Step S51.

On the other hand, in a case in which boundaries between projected image data have been determined for all the y coordinate values to be taken (in the case of "Yes" in Step S59), the second clustering process ends.

Figure 13:
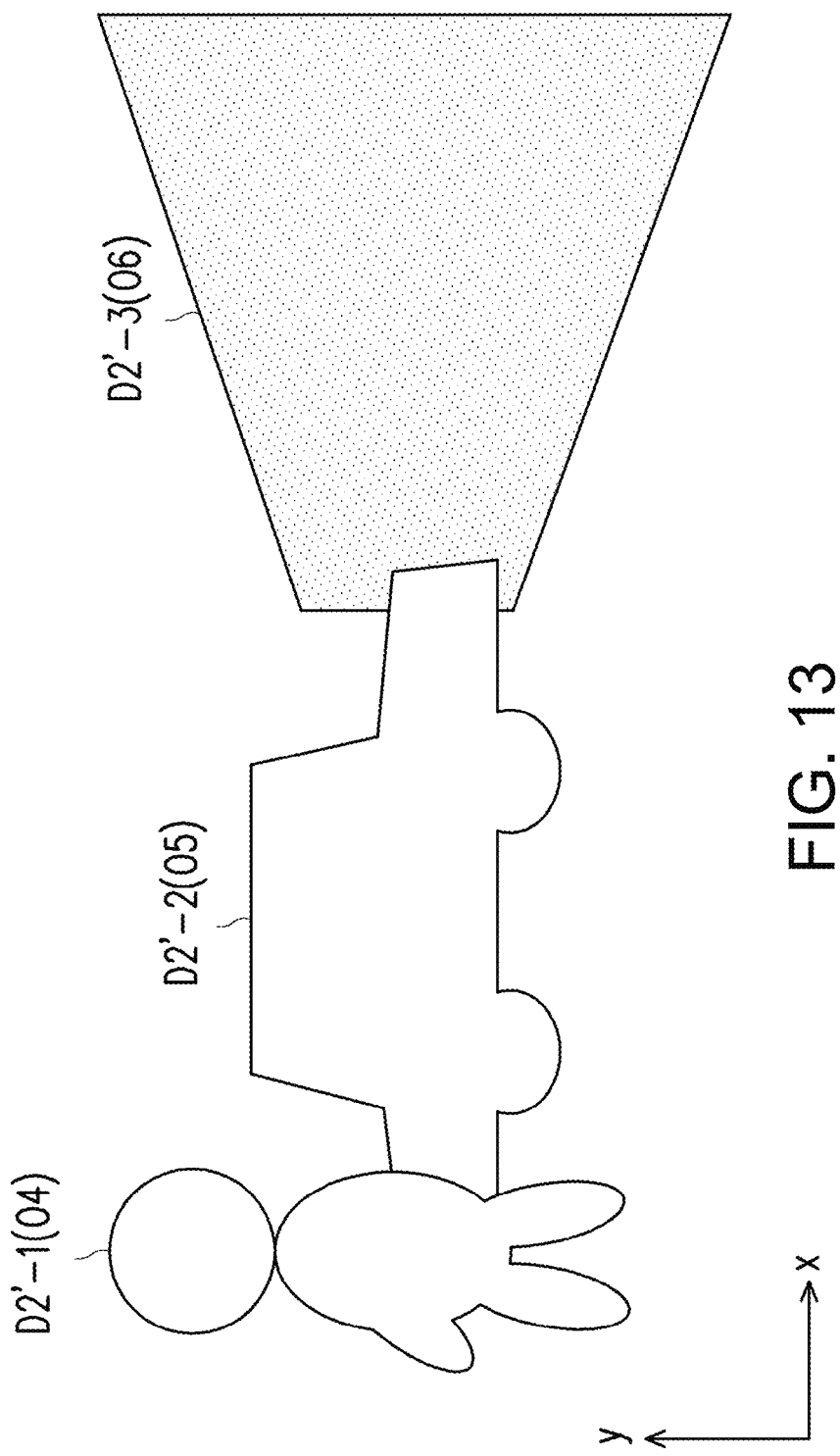
FIG. 13 is a diagram illustrating one example of a result of clustering after the second clustering process is performed.

By executing Steps S51 to S59 described above as the second clustering process, when clustering as illustrated in FIG. 7 is performed (in other words, one object O6 is clustered as a plurality of clusters) by the first clustering process in Step S4 described above, finally, one object can be determined as one cluster with high accuracy as illustrated in FIG. 13. More specifically, for example, by the second clustering process, three pieces of projected image data D2'-1 to D2'-3 can be respectively generated for three objects O4 to O6.

In this way, since the detection signal waveform Wp is continuous information that is a change in the intensity of the second signal with respect to time, the distances and the arrangement states of objects O detected by the detection units 143-1 to 143-n can be determined with high accuracy without depending on the degree of integration or the like of the detection units 143-1 to 143-n.

FIG. 13 is a diagram illustrating one example of a result of clustering after the second clustering process is performed.

In addition, in the second clustering process using the detection signal waveform described above, a boundary of an object can be determined with accuracy higher than that determined in a position information unit of the first data (in other words, in units of detection units). For this reason, for example, an object configured by thin members such as a fence (conventionally, tends to be recognized as a cavity or nothing) can be also recognized in projected image data D2' generated by the second clustering process.

(4-3) Control of Moving Body System

Figure 14:
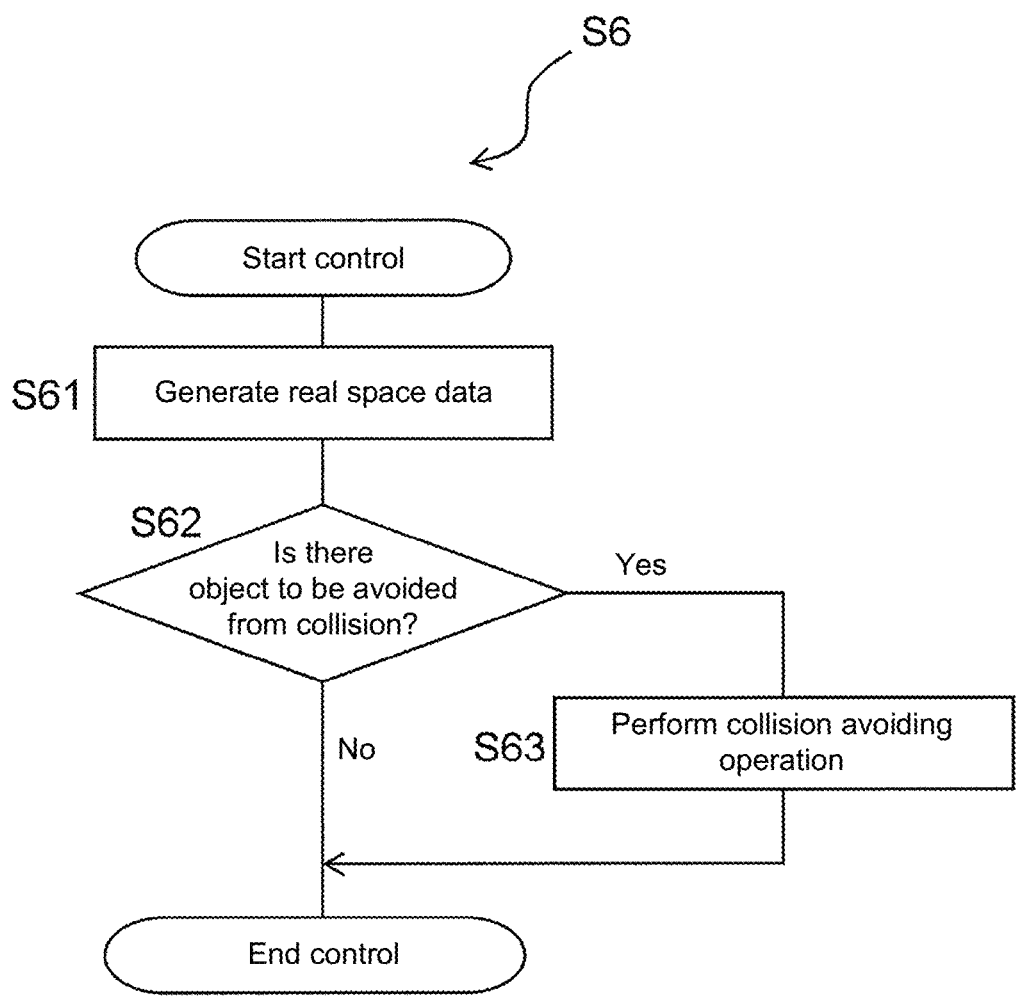
FIG. 14 is a flowchart illustrating the flow of control of a moving body system.

Next, the control of the moving body system 1 executed in Step S6 will be described with reference to FIG. 14. FIG. 14 is a flowchart illustrating the flow of control of the moving body system. Hereinafter, an example of a case in which the traveling function of the moving body system 1 is controlled on the basis of a determined positional relation between a detected object O and the main body 11 will be described.

When the control of the moving body system 1 is started, in order to determine the arrangement position of an object O in a real space in which the moving body system 1 moves, the real space data generating unit 154 generates real space data VD representing the arrangement position of the detected object O in the real space by using projected image data D2'-1 to D'2-3 generated in the second clustering process (Step S61).

More specifically, the real space data generating unit 154 develops second position information included in the projected image data D2'-1 to D2'-3 into a real space coordinate system (X-Y-Z coordinates), and thereby generating real space data VD.

Taking as an example a case in which the p-th second position information (xp, yp, Wp) of the projected image data is developed into the X-Y-Z coordinates, the real space data generating unit 154 first calculates time tp at which a maximum value of the detection signal waveform Wp (a waveform having one maximum value) appears. Next, the real space data generating unit 154 converts the time tp into a distance dp up to the object O (=c*tp/2; here c is the speed of light). Next, the real space data generating unit 154 can calculate coordinate values (Xp, Yp, Zp) of the object O in the X-Y-Z coordinates by converting the coordinates on the basis of a relation between the first coordinates and the real space that is determined under an optical geometric condition of the detection units 143-1 to 143-n by using the coordinate values (xp, yp) of the first coordinates and the distance dp up to the object O.

In addition, time used for calculating the distance to the object O is not limited to the time at which a maximum value appears as described above, and time at which an edge occurs in the detection signal waveform Wp may be set as time used for calculating a distance to the object. More specifically, for example, a rising timing or a falling timing of the detection signal waveform Wp may be selected as time used for calculating a distance up the object O.

On the other hand, in a case in which the detection signal waveform Wp described above has two maximum values (for example, in the case of the second position information on a boundary between projected image data D2'-1 and projected image data D2'-2) at time tp1 and time tp2 (here, tp1<tp2), for example, by using dp=c*(tp1)/2 for the projected image data D2'-1 that is on a closer side of the object detection sensor 14a and dp=c*(tp2)/2 for the projected image data D2'-2 that is on a further farther side thereof, and, as described above, coordinate values of the boundary of the object O4 can be calculated to be (Xp, Yp, Zp1), and coordinate values of the boundary of the object O5 can be calculated to be (Xp, Yp, Zp2).

In addition, in a case in which the detection signal waveform Wp is a waveform having a fixed intensity for a long time (or having a maximum gently changing with respect to time), the real space data generating unit 154, for example, extracts rising time (denoted by tp1') and falling time (denoted by tp2') of the waveform having the fixed intensity for a long time, in other words, times at which edges occur in the detection signal waveform Wp. Next, the real space data generating unit 154 calculates two coordinate values (Xp, Yp, Zp1') and (Xp, Yp, Zp2') of the real space as described above using the two times. In addition, thereafter, the real space data generating unit 154 may set a line (a line parallel to the normal line of the X-Y plane) joining the two coordinate values described above as a boundary in the Z axis direction that is present at (Xp, Yp) of the real space.

Other than that, a timing at which the intensity of the detection signal waveform Wp is stabilized at an almost fixed value in accordance with the rising thereof and/or a timing at which the detection signal waveform Wp starts to fall from a stable state of an approximately fixed value may be the time at which an edge occurs in the detection signal waveform Wp.

Figure 15:
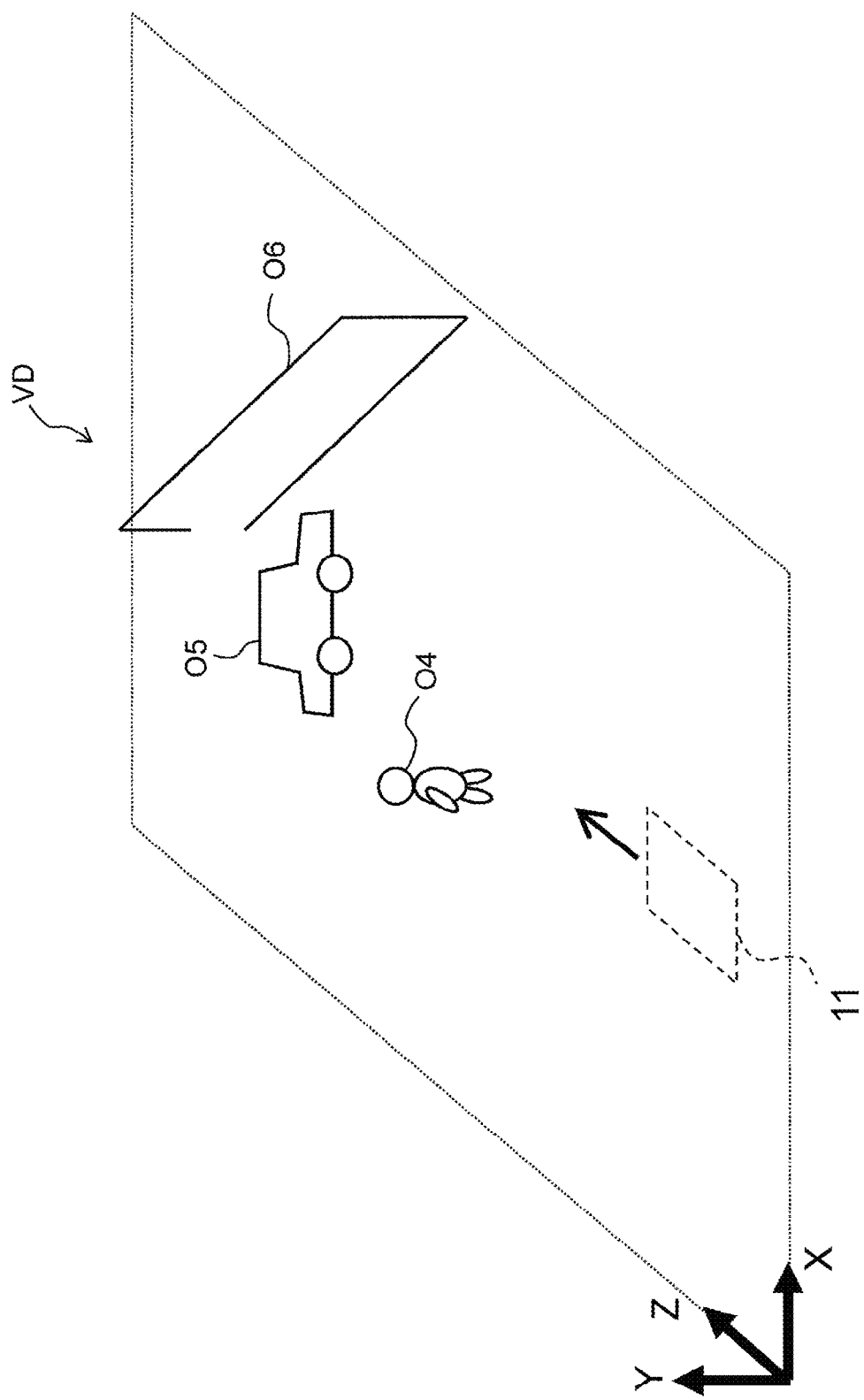
FIG. 15 is a diagram illustrating real space data.

By executing the calculation of coordinate values of the real space described above for three pieces of projected image data D2'-1 to D2'-3 generated after the execution of the second clustering process, the real space data generating unit 154, for example, can generate real space data VD in which each object is arranged at the real space coordinate system (X-Y-Z coordinate system) as illustrated in FIG. 15. FIG. 15 is a diagram illustrating one example of real space data.

As illustrated in FIG. 15, by generating real space data VD by using the three pieces of projected image data D2'-1 to D2'-3 generated after the execution of the second clustering process, the arrangement positions of objects O4 to O6 and the appearance of the object O6 inclined in the Z direction as one object are reflected on the real space data VD.

After the generation of the real space data VD, the real space data outputting unit 155 outputs the generated real space data VD to the moving body control unit 13. The moving body control unit 13 that has received the real space data VD determines whether or not an object O is in the vicinity of the main body 11 (Step S62). More specifically, in a case in which, in the real space data VD, coordinate values entering a range of a predetermined distance from the coordinate values of the main body 11 or less are present within the real space data VD, the moving body control unit 13 determines that an object O for which collision avoidance is necessary is present in the vicinity of the main body 11 (moving body system 1).

In a case in which an object O for which collision avoidance is necessary is determined to be present in the vicinity of the moving body system 1 (in the case of "Yes" in Step S62), the moving body control unit 13 outputs a moving body control direction (Step S63). The moving body control direction, for example, is a direction for avoiding a collision between the object O and the main body 11 by stopping the moving body system 1 (main body 11) in front of the object O. More specifically, the moving body control unit 13 outputs a direction for applying a brake and/or a direction for setting the degree of opening of the accelerator (or an output control mechanism of the engine and/or the electric motor) to "0" as the moving body control signal. In addition, the moving body control unit 13 may output a moving body control direction for steering the steering wheel in a direction for avoiding an object O present in the vicinity of the main body 11.

Furthermore, as is necessary, a moving body control signal for disengaging a clutch between the engine and/or the electric motor and the wheels 12*a* and 12*b* may be output.

By performing the control of the moving body system 1 described above instead of an operator as is necessary, a collision between the object O and the main body 11 can be avoided.

On the other hand, in a case in which an object O is determined not to be present in the vicinity of the moving body system 1 (in the case of "No" in Step S62), the moving body control unit 13 ends the control of the moving body system 1. In such a case, the moving body system 1 can continue to move in accordance with the operation of the operator.

2. Other Embodiments

As above, while one embodiment of the present invention has been described, the present invention is not limited to the embodiment described above, and various changes can be made within a range not departing from the concept of the invention. Particularly, a plurality of embodiments and modified examples described in this specification may be arbitrarily combined as is necessary.

(A) Other Embodiment for Detection Signal Waveform

In the first embodiment described above, in acquiring distances between the detection units 143-1 to 143-*n* and the object O, maximum values of the detection signal waveforms W1 to Wn are acquired. As a method for acquiring maximum values, the following methods may be considered.

For example, it is assumed that a change in the intensity of the reflected light Lr with respect to time can be represented using a normal distribution function, and a normal distribution function is fitted to data in which the intensity of the reflected light Lr and time at which the intensity of the reflected light Lr is acquired are associated with each other. As data used at this time, it is preferable to extract a part of a section in which the intensity is "0" or more. A central value acquired as a result may be set as time at which a maximum value appears. In addition, it may be determined that a maximum is a maximum gently changing with respect to time on the basis of the magnitude of a standard deviation.

(B) Other Embodiment for Clustering of First Data

In the embodiment described above, first, the first clustering process based on a distance (time at which a maximum value appears) represented in the first position information is performed for the first data D1, and next, the second clustering process using the characteristics of the detection signal waveform is performed for projected image data D2 generated by performing the first clustering process, and accordingly, projected image data D2' clustered at high accuracy is generated.

However, even in a case in which the second clustering process is directly performed for the first data D1 not through the first clustering process, the projected image data D2' clustered with high accuracy can be generated.

For example, a case will be considered in which the y coordinate value of the first position information of the first data D1 is fixed to y=yi,' and a detection signal waveform associated with the first position information is scanned in the x-axis direction. At this time, in a case in which a detection signal waveform having a steep waveform of which a half value width is narrow as illustrated in FIG. 16A appears, for example, in an x-t coordinate system, straight lines (in the case illustrated in FIG. 16A, a straight line of t=t3 and a straight line of t=t4), which are parallel to the x axis, each having a coordinate value of the time t set as time at which a maximum value appears in the detection signal waveform are defined for the x coordinate values for which the detection signal waveform appears.

In addition, for x coordinate values at which two maximum values are present, two straight lines, which are parallel to the x axis, corresponding to the maximum values are defined.

Figure 16A:
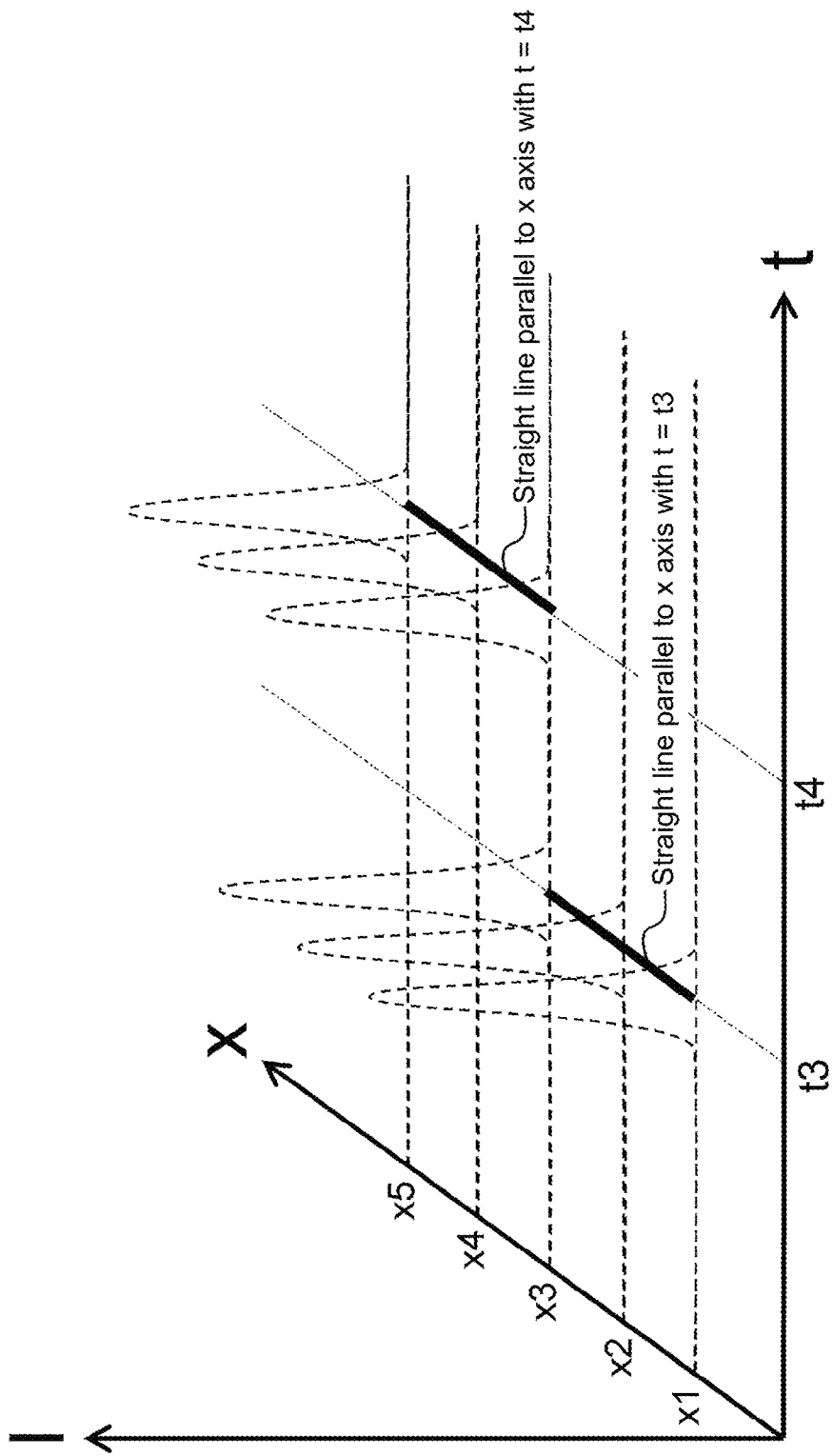
FIG. 16A is a diagram illustrating one example of the process of clustering first data in accordance with detection signal waveforms.
Figure 16B:
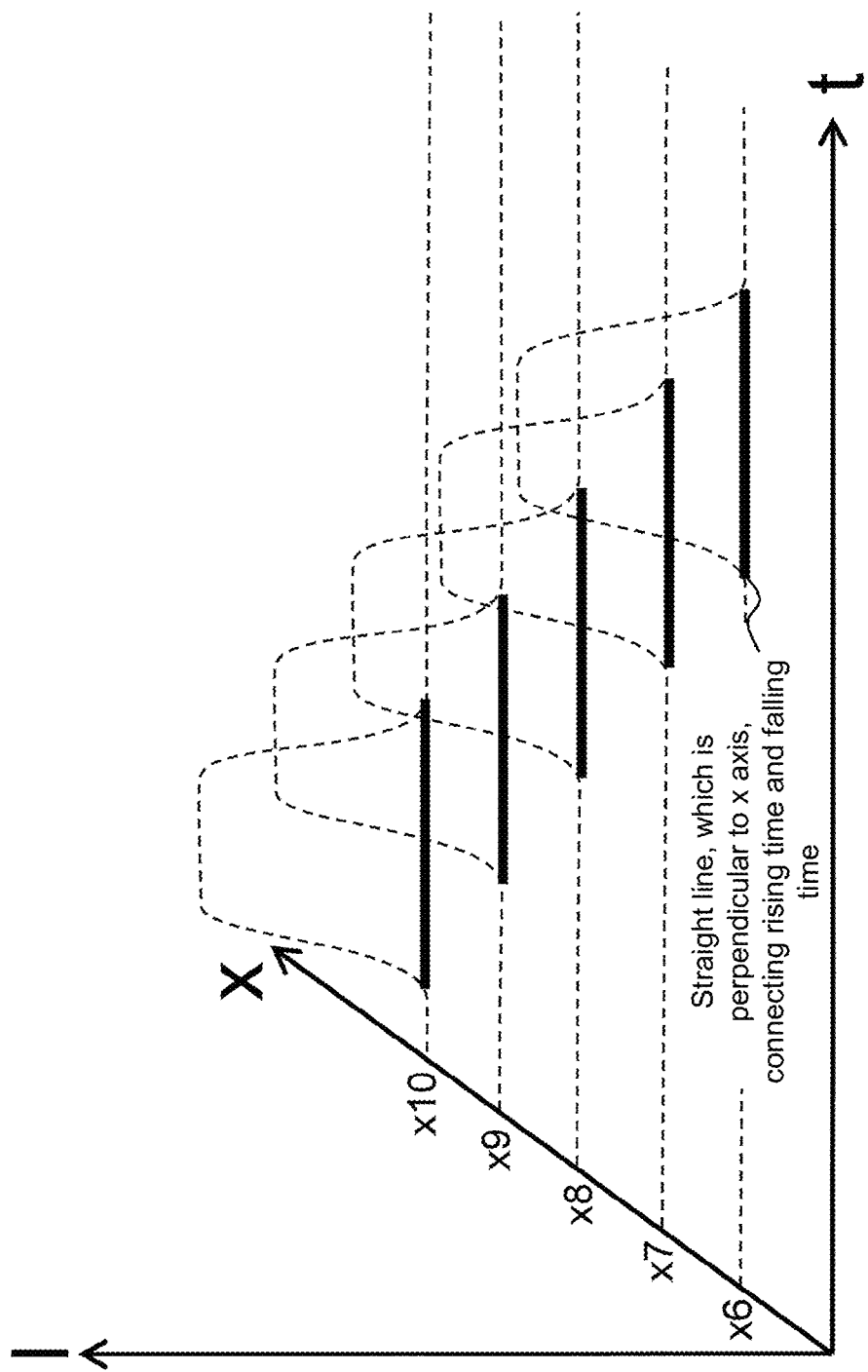
FIG. 16B is a diagram illustrating one example of the process of clustering the first data in accordance with a detection signal waveform.

On the other hand, as illustrated in FIG. 16B, in a case in which a detection signal waveform having a waveform of which the intensity has a fixed value over a long time appears, for example, a straight line, which is perpendicular to the x axis, joining the rising time and the falling time of the waveform (in other words, the time of edges of the detection signal waveform) can be defined. Alternatively, as illustrated in FIG. 16C, a straight line joining middle times between the rising times and the falling times of the waveforms of which the intensity has a fixed value over a long time may be defined using a straight line.

Figure 16C:
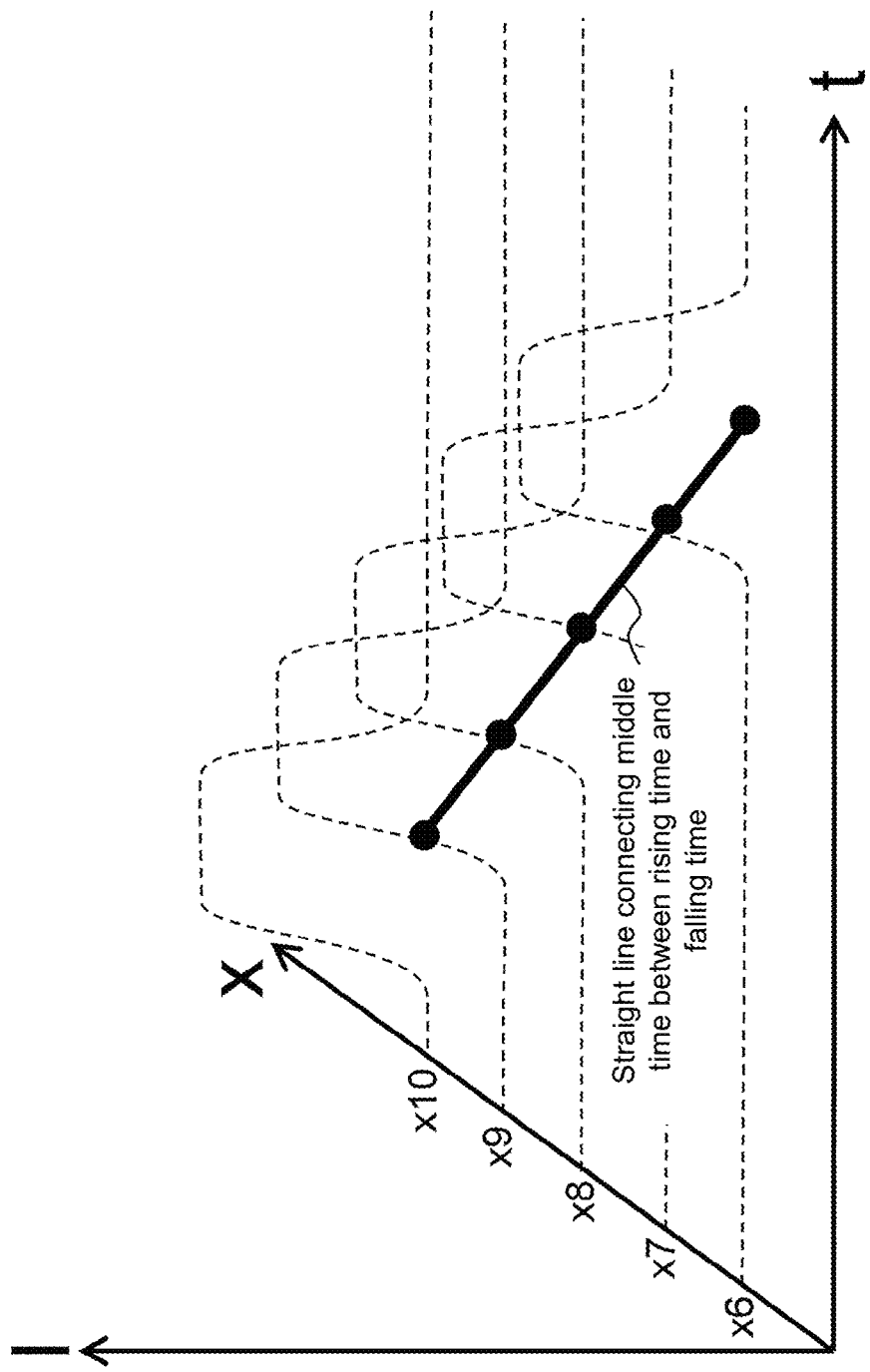
FIG. 16C is a diagram illustrating one example of the process of clustering the first data in accordance with a detection signal waveform.

FIGS. 16A to 16C are diagrams illustrating examples of the process of clustering first data in accordance with detection signal waveforms.

Figure 17:
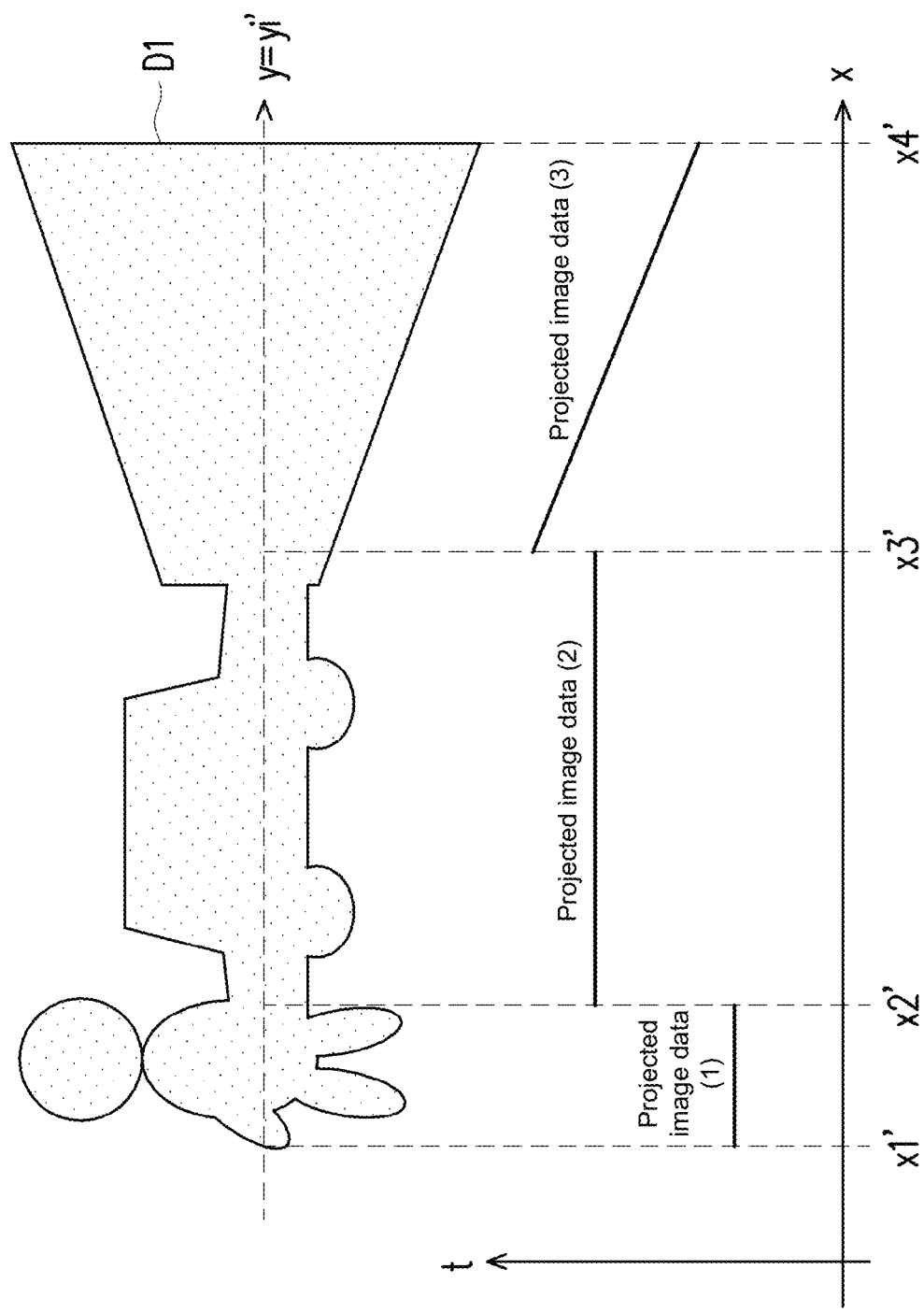
FIG. 17 is a diagram illustrating one example of a result of execution of clustering of the first data in accordance with a detection signal waveform.

When the first data D1 is clustered as illustrated in FIGS. 16A to 16C, for example, in a case in which first data D1 as illustrated in an upper diagram in FIG. 17 is acquired, a result of the clustering as illustrated in a lower diagram in FIG. 17 can be acquired at y=yi'. FIG. 17 is a diagram illustrating one example of a result of execution of clustering of the first data in accordance with detection signal waveforms.

In a result of the clustering illustrated in a lower diagram in FIG. 17, the intensity of the detection signal waveform is "0" for x coordinate values in the range of x<x1' and x>x4'. On the other hand, at x=x2' and x3', fragments of straight lines can be seen. In other words, in a result of the clustering illustrated in FIG. 17, rapid changes in time are seen at x coordinate values x1' to x4'.

By detecting such a rapid change in time (for example, it can be detected by differentiating the result of the clustering with the x coordinate value), for y=yi', projected image data D2'-1 (projected image data (1)) in the range of x1'≤x≤x2', projected image data D2'-2 (projected image data (2)) in the range of x2'≤x≤x3', and projected image data D2'-3 (projected image data (3)) in the range of x3'≤x≤x4' and three pieces of projected image data can be determined.

By executing the operation described above for all the y coordinate values taken by the first position information, clustering of data can be executed for all the first position information included in the first data D1.

As described above, also in a case in which clustering using the detection signal waveform is executed also for the first data D1, one piece of projected image data can be determined with high accuracy for one detected object without depending on the degree of integration or the like of the plurality of detection units 143-1 to 143-*n* of the object detection sensor 14*a*.

The present invention can be broadly applied to an object detection device that recognizes an object present nearby and executes a predetermined process.

What is claimed is:

1. An object detection device comprising:
a light source that outputs a first signal toward an object;
a sensor comprising a plurality of detection units each detecting a second signal generated when the first signal is reflected by the object as a signal representing a distance to the object present in an observed area and a shape of the object, wherein the plurality of detection units comprises three or more detection units; and
a hardware controller, being configured to function as:
a data acquiring unit that acquires, for each of the plurality of detection units, a detection signal waveform represented as a change in an intensity of the second signal with respect to time; and
an object information determining unit that determines a presence range of the object by determining whether two or more arbitrary detection units correspond to the same object or different objects on the basis of the detection signal waveform.

2. The object detection device according to claim 1, wherein the two or more arbitrary detection units are adjacent to each other on a detection surface.

3. The object detection device according to claim 1, wherein the object information determining unit determines whether the two or more arbitrary detection units correspond to the same object or different objects on the basis of a shape pattern of the detection signal waveform, and
wherein a distance between the detection unit and the object is calculated, at least for each detection unit of the two or more arbitrary detection units, on the basis of a time at which an edge is generated in the detection signal waveform.

4. The object detection device according to claim 1, wherein, in a case in which one or more maximums of intensity are present in the detection signal waveform detected by one detection unit among the two or more arbitrary detection units, and time at which a maximum of the intensity of the detection signal waveform detected by another detection unit is taken coincides with any one of times at which the one or more maximums are taken, the object information determination unit determines that the two or more arbitrary detection units corresponds to the same object.

5. The object detection device according to claim 1, wherein, in a case in which the detection signal waveform detected by each of the two or more arbitrary detection units have intensities fixed over long times or have maximums changing gently with respect to time, and time periods in which the detection signal waveforms having the intensities fixed over the long times or having the maximums gently changing with respect to time are generated overlap with each other, the object information determining unit determines that the two or more arbitrary detection units correspond to the same object.

6. The object detection device according to claim 1, wherein, in a case in which one or more maximums of the intensity are present in the detection signal waveform detected by one detection unit among the two or more arbitrary detection units, and time at which a maximum of the intensity is taken in the detection signal waveform detected by another detection unit does not coincide with any one of times at which the one or more maximums are taken, the object info Illation determining unit determines that the two or more arbitrary detection units correspond to different objects.

7. The object detection device according to claim 1, wherein, in a case in which the detection signal waveform detected by each of the two or more arbitrary detection units have intensities fixed over long times or have maximum values changing gently with respect to time, and time periods in which the detection signal waveforms having the intensities fixed over the long times or having maximums changing gently with respect to time do not overlap with each other, the object information determining unit determines that the two or more arbitrary detection units correspond to different objects.

8. The object detection device according to claim 1, wherein, in a case in which a signal waveform having an intensity fixed over a long time is acquired by adding the detection signal waveform of each of the two or more arbitrary detection units, the object information determining unit determines that the two or more arbitrary detection units correspond to the same object.

9. An object detection method in an object detection device including a plurality of detection units, the object detection method comprising:
 outputting a first signal toward an object;
 detecting a second signal generated when the first signal is reflected by the object as a signal representing a distance to the object present in an observed area and a shape of the object by using the plurality of detection units, wherein the plurality of detection units comprises three or more detection units;
 acquiring a detection signal waveform, for each of the plurality of detection units, represented as a change in an intensity of the second signal with respect to time; and
 determining a presence range of the object by determining whether two or more arbitrary detection units correspond to the same object or different objects on the basis of the detection signal waveform.

10. A program stored on a non-transitory computer readable medium, wherein the program causes a computer to execute the object detection method according to claim 9.

11. The object detection device according to claim 2, wherein the object information determining unit determines whether the two or more arbitrary detection units correspond to the same object or different objects on the basis of a shape pattern of the detection signal waveform, and
 wherein a distance between the detection unit and the object is calculated, at least for each detection unit of the two or more arbitrary detection units, on the basis of a time at which an edge is generated in the detection signal waveform.

12. The object detection device according to claim 2, wherein, in a case in which one or more maximums of intensity are present in the detection signal waveform detected by one detection unit among the two or more arbitrary detection units, and time at which a maximum of the intensity of the detection signal waveform detected by another detection unit is taken coincides with any one of times at which the one or more maximums are taken, the object information determination unit determines that the two or more arbitrary detection units corresponds to the same object.

13. The object detection device according to claim 3, wherein, in a case in which one or more maximums of intensity are present in the detection signal waveform detected by one detection unit among the two or more arbitrary detection units, and time at which a maximum of the intensity of the detection signal waveform detected by another detection unit is taken coincides with any one of times at which the one or more maximums are taken, the object information determination unit determines that the two or more arbitrary detection units corresponds to the same object.

14. The object detection device according to claim 2, wherein, in a case in which the detection signal waveform detected by each of the two or more arbitrary detection units have intensities fixed over long times or have maximums changing gently with respect to time, and time periods in which the detection signal waveforms having the intensities fixed over the long times or having the maximums gently changing with respect to time are generated overlap with each other, the object information determining unit determines that the two or more arbitrary detection units correspond to the same object.

15. The object detection device according to claim 3, wherein, in a case in which the detection signal waveform detected by each of each of the two or more arbitrary detection units have intensities fixed over long times or have maximums changing gently with respect to time, and time periods in which the detection signal waveforms having the intensities fixed over the long times or having the maximums gently changing with respect to time are generated overlap with each other, the object information determining unit determines that the two or more arbitrary detection units correspond to the same object.

16. The object detection device according to claim 2, wherein, in a case in which one or more maximums of the intensity are present in the detection signal waveform detected by one detection unit among the two or more arbitrary detection units, and time at which a maximum of the intensity is taken in the detection signal waveform detected by another detection unit does not coincide with any one of times at which the one or more maximums are taken, the object information determining unit determines that the two or more arbitrary detection units correspond to different objects.

17. The object detection device according to claim 3, wherein, in a case in which one or more maximums of the intensity are present in the detection signal waveform detected by one detection unit among the two or more arbitrary detection units, and time at which a maximum of the intensity is taken in the detection signal waveform detected by another detection unit does not coincide with any one of times at which the one or more maximums are taken, the object information determining unit determines that the two or more arbitrary detection units correspond to different objects.

18. The object detection device according to claim 2, wherein, in a case in which the detection signal waveform detected by each of each of the two or more arbitrary detection units have intensities fixed over long times or have maximum values changing gently with respect to time, and time periods in which the detection signal waveforms having the intensities fixed over the long times or having maximums changing gently with respect to time do not overlap with each other, the object information determining unit determines that the two or more arbitrary detection units correspond to different objects.

19. The object detection device according to claim 3, wherein, in a case in which the detection signal waveform detected by each of each of the two or more arbitrary detection units have intensities fixed over long times or have maximum values changing gently with respect to time, and time periods in which the detection signal waveforms having the intensities fixed over the long times or having maximums changing gently with respect to time do not overlap with each other, the object information determining unit determines that the two or more arbitrary detection units correspond to different objects.

20. The object detection device according to claim 2, wherein, in a case in which a signal waveform having an intensity fixed over a long time is acquired by adding the detection signal waveform of each of the two or more arbitrary detection units, the object information determining unit determines that the two or more arbitrary detection units correspond to the same object.

\* \* \* \* \*